United States Patent
Popov

(10) Patent No.: US 12,362,983 B2
(45) Date of Patent: Jul. 15, 2025

(54) ZERO-CROSSING-AVOIDANCE ENCODING FOR QUADRATURE AMPLITUDE MODULATION

(71) Applicant: Qualcomm Incorporated, San Diego, CA (US)

(72) Inventor: Oleg Popov, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 18/169,548

(22) Filed: Feb. 15, 2023

(65) Prior Publication Data
US 2024/0275660 A1  Aug. 15, 2024

(51) Int. Cl.
H04L 27/36 (2006.01)

(52) U.S. Cl.
CPC .......... H04L 27/364 (2013.01); H04L 27/366 (2013.01)

(58) Field of Classification Search
CPC . H04L 27/364; H04L 27/366; H04L 27/3411; H04L 2027/0018; H04L 2027/0083; H04L 27/2078; H04L 27/36; H04L 27/3405
See application file for complete search history.

(56) References Cited

U.S. PATENT DOCUMENTS

| | | | | |
|---|---|---|---|---|
| 5,923,223 A * | 7/1999 | Termerinac | ......... | H04L 27/2082 329/304 |
| 6,373,879 B1 * | 4/2002 | Park | ..................... | H04J 13/0003 375/140 |
| 7,579,922 B2 * | 8/2009 | Jensen | ..................... | H03L 7/093 332/120 |
| 7,738,572 B2 | 6/2010 | Lin | | |
| 7,940,142 B2 * | 5/2011 | Jensen | ................. | H03L 7/1976 332/120 |

(Continued)

FOREIGN PATENT DOCUMENTS

| AU | 2008324246 A1 * | 5/2010 | ......... H04L 27/0008 |
|---|---|---|---|
| CA | 2670378 A1 * | 7/2008 | ............ H04W 16/14 |

(Continued)

OTHER PUBLICATIONS

P. Philippe, "A zero crossing avoidance predistortion technique for polar transmitters," 2008 15th IEEE International Conference on Electronics, Circuits and Systems, Saint Julian's, Malta, 2008, pp. 814-817 (Year: 2008).*

(Continued)

*Primary Examiner* — Berhanu Tadese
(74) *Attorney, Agent, or Firm* — QUALCOMM Incorporated

(57) ABSTRACT

An apparatus for wireless communication is disclosed that performs zero-crossing-avoidance encoding for quadrature amplitude modulation. In an example aspect, the apparatus includes a polar transceiver configured to be coupled to an antenna. The polar transceiver is configured to transmit, via the antenna, data including multiple symbols associated with quadrature amplitude modulation. The multiple symbols include multiple sets of two consecutive symbols. An absolute value of a phase difference between the two consecutive symbols within each set of the multiple sets is substantially different than 180 degrees.

28 Claims, 12 Drawing Sheets

(56) References Cited

U.S. PATENT DOCUMENTS

| | | | |
|---|---|---|---|
| 7,995,663 B2* | 8/2011 | Seki | H04L 27/2623 375/295 |
| 8,199,736 B2* | 6/2012 | Niemela | H04W 16/14 370/339 |
| 8,218,421 B2* | 7/2012 | Niemela | H04L 27/34 375/267 |
| 8,588,720 B2* | 11/2013 | Ballantyne | H03D 7/165 327/299 |
| 8,723,613 B2* | 5/2014 | Sun | H04L 27/205 375/302 |
| 8,923,434 B2 | 12/2014 | Menkhoff et al. | |
| 9,000,858 B2* | 4/2015 | Sun | H04L 27/2003 332/119 |
| 9,002,301 B1* | 4/2015 | Vercesi | H03C 5/00 455/114.2 |
| 10,523,489 B1* | 12/2019 | Sharpe | H04L 27/3405 |
| 10,644,926 B1* | 5/2020 | Lopelli | H04L 27/2003 |
| 10,735,229 B1* | 8/2020 | Jakubov | H04L 27/122 |
| 10,819,554 B2* | 10/2020 | Sharpe | H04L 27/364 |
| 10,897,275 B2* | 1/2021 | Preissl | H04B 1/0475 |
| 11,349,695 B2* | 5/2022 | Baldemair | H04L 27/2613 |
| 11,770,129 B2* | 9/2023 | Mirhaj | H03M 1/167 341/158 |
| 12,028,024 B2* | 7/2024 | Srinivasan | H03K 5/00 |
| 2008/0007346 A1* | 1/2008 | Jensen | H03C 3/095 331/16 |
| 2008/0049864 A1 | 2/2008 | Eriksson et al. | |
| 2008/0159246 A1* | 7/2008 | Niemela | H04W 16/14 370/339 |
| 2009/0086834 A1* | 4/2009 | Seki | H04L 27/2623 375/260 |
| 2009/0190548 A1* | 7/2009 | Niemela | H04L 27/18 370/329 |
| 2009/0278613 A1* | 11/2009 | Jensen | H03C 3/0941 331/16 |
| 2020/0153674 A1* | 5/2020 | Sharpe | H03F 3/24 |
| 2020/0259693 A1* | 8/2020 | Baldemair | H04L 27/2613 |
| 2024/0073071 A1* | 2/2024 | McFarthing | H04L 27/36 |
| 2024/0275660 A1* | 8/2024 | Popov | H04L 27/36 |

FOREIGN PATENT DOCUMENTS

| | | | | |
|---|---|---|---|---|
| CA | 2670378 C | * | 11/2018 | H04W 16/14 |
| CN | 1370366 A | * | 9/2002 | H04L 27/38 |
| CN | 1149805 C | * | 5/2004 | H04L 27/38 |
| CN | 201896697 U | * | 7/2011 | |
| CN | 105680740 B | * | 6/2018 | H02P 6/08 |
| CN | 110299872 A | * | 10/2019 | B60L 15/025 |
| CN | 111181883 A | * | 5/2020 | H04L 25/03834 |
| CN | 111630822 A | * | 9/2020 | H03K 4/92 |
| CN | 113196651 A | * | 7/2021 | H04B 1/0475 |
| CN | 113815903 A | * | 12/2021 | B64G 1/244 |
| CN | 111238547 B | * | 2/2022 | G01D 5/249 |
| CN | 116331525 A | * | 6/2023 | B64G 1/244 |
| CN | 117278375 A | * | 12/2023 | H03K 4/92 |
| CN | 117981226 A | * | 5/2024 | H03M 1/1245 |
| DE | 60316753 T2 | * | 7/2008 | H04J 13/0048 |
| DE | 102013110295 A1 | * | 3/2015 | H03C 5/00 |
| DE | 102018216284 A1 | * | 3/2020 | |
| DE | 112019006464 T5 | * | 9/2021 | H04B 1/0475 |
| EP | 2098000 B1 | * | 1/2018 | H04W 16/14 |
| EP | 2218232 B1 | * | 1/2018 | H04L 27/0008 |
| EP | 3310088 A1 | * | 4/2018 | H04W 16/14 |
| EP | 3343854 A1 | * | 7/2018 | H04L 27/0008 |
| EP | 3310088 B1 | * | 6/2019 | H04W 16/14 |
| EP | 3531734 A1 | * | 8/2019 | H04W 16/14 |
| JP | 2011166291 A | | 8/2011 | |
| JP | 4958775 B2 | * | 6/2012 | H04L 27/2623 |
| JP | 2019170044 A | * | 10/2019 | B60L 15/025 |
| KR | 1809378 B1 | * | 12/2017 | H04L 27/20 |
| RU | 2467494 C2 | * | 11/2012 | H04L 27/0008 |
| RU | 2480933 C2 | * | 4/2013 | H04L 27/18 |
| TW | 202046692 A | * | 12/2020 | H04B 1/04 |
| TW | 202416695 A | * | 4/2024 | H04L 27/20 |
| WO | WO-02096009 A2 | * | 11/2002 | H03M 13/258 |
| WO | WO-2007000923 A1 | * | 1/2007 | H04L 27/2623 |
| WO | WO-2008081076 A1 | * | 7/2008 | H04W 16/14 |
| WO | WO-2009059946 A2 | * | 5/2009 | H04L 27/0008 |
| WO | WO-2019081627 A1 | * | 5/2019 | H04L 27/20 |
| WO | WO-2020139435 A1 | * | 7/2020 | H04B 1/0475 |
| WO | WO-2020242757 A1 | * | 12/2020 | H04B 1/04 |
| WO | WO-2021237603 A1 | * | 12/2021 | G01D 21/00 |
| WO | WO-2023049587 A1 | * | 3/2023 | H03M 1/1245 |
| WO | WO-2024050215 A1 | * | 3/2024 | H04L 27/2067 |
| WO | WO-2024172973 A1 | * | 8/2024 | H04L 27/2078 |

OTHER PUBLICATIONS

J. Zhuang, K. Waheed and R. B. Staszewski, "A Technique to Reduce Phase/Frequency Modulation Bandwidth in a Polar RF Transmitter," in IEEE Transactions on Circuits and Systems I: Regular Papers, vol. 57, No. 8, pp. 2196-2207, Aug. 2010 (Year: 2010).*

J. Zhuang, et al., "A Technique to Reduce Phase/Frequency Modulation Bandwidth in a Polar RF Transmitter," in IEEE Transactions on Circuits and Systems I: Regular Papers, vol. 57, No. 8, pp. 2196-2207, Aug. 2010 (Year: 2010).*

International Search Report and Written Opinion—PCT/US2024/011826—ISA/EPO—May 27, 2024, 15 pages.

* cited by examiner

1000

```
┌─────────────────────────────────────┐
│ Accept a first pair of consecutive symbols │
│ associated with quadrature amplitude modulation, │
│ the first pair of consecutive symbols comprising │
│ a first symbol and a second symbol │
│ 1002 │
└─────────────────────────────────────┘
                    ↓
┌─────────────────────────────────────┐
│ Output the first symbol as part │
│ of an encoded data sequence │
│ 1004 │
└─────────────────────────────────────┘
                    ↓
┌─────────────────────────────────────┐
│ Determine that the first pair of consecutive │
│ symbols is associated with a zero-crossing condition │
│ 1006 │
└─────────────────────────────────────┘
                    ↓
┌─────────────────────────────────────┐
│ Modify, based on the determination, the │
│ second symbol to generate a modified symbol │
│ that avoids the zero-crossing condition │
│ 1008 │
└─────────────────────────────────────┘
```

```
┌─────────────────────────────────────────────┐
│ Accept a first pair of consecutive symbols  │
│ associated with quadrature amplitude        │
│ demodulation, the first pair of consecutive │
│ symbols comprising                          │
│ a first symbol and a second symbol          │
│ 1102                                        │
└─────────────────────────────────────────────┘
                      │
                      ▼
┌─────────────────────────────────────────────┐
│ Accept a correction list that identifies    │
│ the second symbol within the first pair of  │
│ consecutive symbols as having been modified │
│ using zero-crossing-avoidance encoding      │
│ 1104                                        │
└─────────────────────────────────────────────┘
                      │
                      ▼
┌─────────────────────────────────────────────┐
│ Modify, based on the correction list, the   │
│ second symbol to reverse the zero-crossing- │
│ avoidance encoding and generate a modified  │
│ symbol associated with a zero-crossing      │
│ condition                                   │
│ 1106                                        │
└─────────────────────────────────────────────┘
                      │
                      ▼
┌─────────────────────────────────────────────┐
│ Output the first symbol and the modified    │
│ symbol as part of a decoded data sequence   │
│ 1108                                        │
└─────────────────────────────────────────────┘
```

FIG. 11

ZERO-CROSSING-AVOIDANCE ENCODING FOR QUADRATURE AMPLITUDE MODULATION

TECHNICAL FIELD

This disclosure relates generally to wireless transceivers and other components that employ quadrature amplitude modulation and, more specifically, to encoding symbols associated with quadrature amplitude modulation to avoid a zero-crossing condition.

BACKGROUND

Electronic devices use radio-frequency (RF) signals to communicate information. These radio-frequency signals enable users to talk with friends, download information, share pictures, remotely control household devices, and receive global positioning information. While it can be desirable to design an electronic device with a smaller footprint and a longer battery life to support mobile operations, it can be challenging to design a wireless transceiver that satisfies the size and/or power constraints of the electronic device.

SUMMARY

An apparatus is disclosed that implements zero-crossing-avoidance encoding for quadrature amplitude modulation. In particular, a modem encodes symbols associated with quadrature amplitude modulation in a manner that avoids zero-crossing conditions. For example, the modem modifies a symbol's phase such that an absolute value of a phase difference between two consecutive symbols is substantially different than 180 degrees. Optionally, the modem can further modify the symbol's amplitude. In some cases, zero-crossing-avoidance encoding causes the symbol to have a same symbol state as a preceding symbol. The zero-crossing-avoidance encoder also generates a correction list to identify the symbols that are encoded using zero-crossing-avoidance encoding. With zero-crossing-avoidance encoding, a wireless transceiver can perform quadrature amplitude modulation and satisfy adjacent-channel-power (ACP) and/or error-vector-magnitude performance (EVM) metrics of the electronic device. Techniques associated with zero-crossing-avoidance encoding can apply to a variety of different types of wireless transceivers, including polar transceivers and Cartesian transceivers.

In an example aspect, an apparatus for wireless communication is disclosed. The apparatus includes a polar transceiver configured to be coupled to an antenna. The polar transceiver is configured to transmit, via the antenna, data including multiple symbols associated with quadrature amplitude modulation. The multiple symbols include multiple sets of two consecutive symbols. An absolute value of a phase difference between the two consecutive symbols within each set of the multiple sets is substantially different than 180 degrees.

In an example aspect, an apparatus for wireless communication is disclosed. The apparatus includes a wireless transceiver configured to be coupled to an antenna. The wireless transceiver is also configured to communicate, via the antenna, data. The data includes multiple symbols associated with quadrature amplitude modulation and encoded using zero-crossing-avoidance encoding. The wireless transceiver is additionally configured to communicate, via the antenna, a correction list identifying symbols of the multiple symbols that have been encoded using the zero-crossing-avoidance encoding.

In an example aspect, a method for performing zero-crossing-avoidance encoding is disclosed. The method includes accepting a first pair of consecutive symbols associated with quadrature amplitude modulation. The first pair of consecutive symbols includes a first symbol and a second symbol. The method also includes outputting the first symbol as part of an encoded data sequence. The method additionally includes determining that the first pair of consecutive symbols is associated with a zero-crossing condition. Based on the determination, the method includes modifying the second symbol to generate a modified symbol that avoids the zero-crossing condition.

In an example aspect, a computer-readable storage medium is disclosed. The computer-readable storage medium includes instructions that, responsive to execution by a processor, cause the processor to accept a first pair of consecutive symbols associated with quadrature amplitude modulation. The first pair of consecutive symbols includes a first symbol and a second symbol. The instructions also cause the processor to output the first symbol as part of an encoded data sequence. The instructions further cause the processor to determine that the first pair of consecutive symbols is associated with a zero-crossing condition. The instructions also cause the processor to modify, based on the determination, the second symbol to generate a modified symbol that avoids the zero-crossing condition. The instructions further cause the processor to generate a correction list that indicates the second symbol has been modified to avoid the zero-crossing condition.

BRIEF DESCRIPTION OF DRAWINGS

FIG. 6-1 illustrates an example sequence of symbols that is associated with a zero-crossing condition.

FIG. 6-2 illustrates an example sequence of symbols encoded using zero-crossing-avoidance encoding.

FIG. 10 is a flow diagram for performing zero-crossing-avoidance encoding.

FIG. 11 is a flow diagram for performing zero-crossing-avoidance decoding.

DETAILED DESCRIPTION

Figure 1:
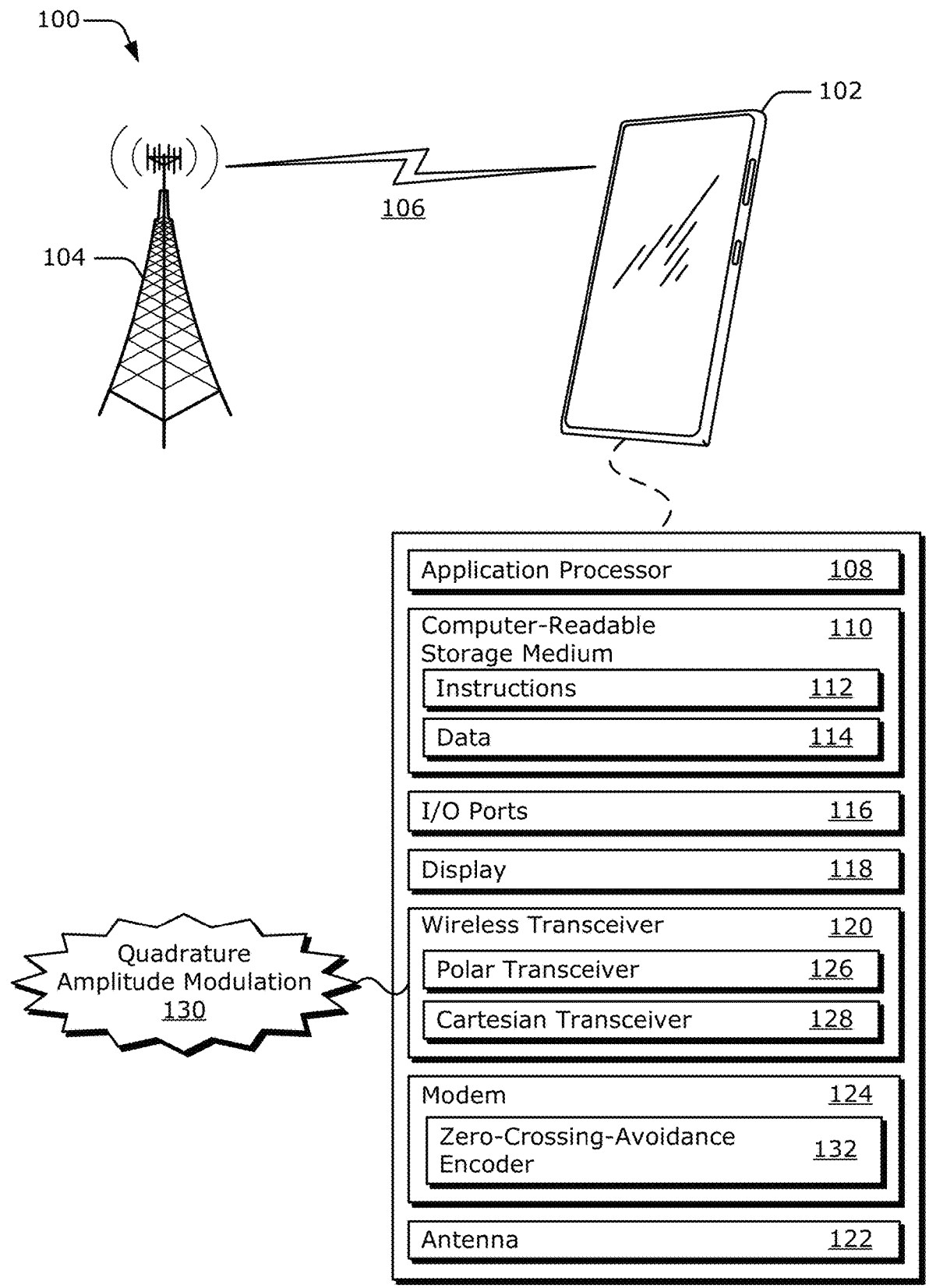
FIG. 1 illustrates an example operating environment for a device that supports zero-crossing-avoidance encoding for quadrature amplitude modulation.

Electronic devices use radio-frequency (RF) signals to communicate information. To increase throughput for a given bandwidth, electronic devices can use techniques, such as quadrature amplitude modulation (or quadrature modulation), to communicate multiple bits per symbol. Quadrature amplitude modulation uses amplitude modulation, phase modulation, and/or both amplitude and phase modulation to modulate information onto a carrier signal. A Cartesian transceiver (or an in-phase-and-quadrature (IQ) transceiver) is a type of wireless transceiver that can perform quadrature amplitude modulation. The Cartesian transceiver includes an IQ modulator/demodulator. Hardware limitations of the Cartesian transceiver, however, can make it challenging to meet the size and/or power constraints of the electronic device.

Another type of wireless transceiver is a polar transceiver. While the Cartesian transceiver can encode information via in-phase and quadrature basis vectors, a polar transmitter encodes information via polar basis vectors (e.g., amplitude and phase). In comparison to the Cartesian transceiver, the polar transceiver can have a smaller footprint and consume less power.

Some types of quadrature amplitude modulations can generate two consecutive symbols with symbol states that are approximately 180 degrees out-of-phase. This causes a signal trajectory between these two symbol states to pass through an origin of a constellation diagram, which is referred to as a zero-crossing condition. Some polar transmitters, such as those with frequency modulators, may not be capable of realizing a phase shift of 180 degrees because it requires an infinite deviation in frequency. This limitation generates phase distortion, which can degrade the adjacent-channel-power (ACP) and/or error-vector-magnitude (EVM) performance of the polar transmitter. Consequently, it can be challenging for the polar transmitter to satisfy performance metrics of the electronic device under zero-crossing conditions.

To avoid the zero-crossing conditions, some electronic devices use the polar transmitter with other types of modulations that do not invoke the zero-crossing condition. In this case, the electronic device does not perform quadrature amplitude modulations that can invoke zero-crossing conditions. Other techniques can add a certain amount of distortion to get around the zero-crossing condition. This additional distortion, however, can make it challenging for the polar transmitter to satisfy the adjacent-channel-power and/or the error-vector-magnitude limits of the electronic device.

In contrast, example techniques for performing zero-crossing-avoidance encoding for quadrature amplitude modulation are described. In particular, a modem encodes symbols associated with quadrature amplitude modulation in a manner that avoids zero-crossing conditions. For example, the modem modifies a symbol's phase such that an absolute value of a phase difference between two consecutive symbols is substantially different than 180 degrees. Optionally, the modem can further modify the symbol's amplitude. In some cases, zero-crossing-avoidance encoding causes the symbol to have a same symbol state as a preceding symbol. The zero-crossing-avoidance encoder also generates a correction list to identify the symbols that are encoded using zero-crossing-avoidance encoding. With zero-crossing-avoidance encoding, a wireless transceiver can perform quadrature amplitude modulation and satisfy adjacent-channel-power and/or error-vector-magnitude performance metrics of the electronic device. Techniques associated with zero-crossing-avoidance encoding can apply to a variety of different types of wireless transceivers, including polar transceiver and Cartesian transceivers.

FIG. 1 illustrates an example environment 100 for implementing aspects of zero-crossing-avoidance encoding for quadrature amplitude modulation. In the environment 100, a computing device 102 communicates with a base station 104 through a wireless communication link 106 (wireless link 106). In this example, the computing device 102 is depicted as a smartphone. However, the computing device 102 can be implemented as any suitable computing or electronic device, such as a modem, a cellular base station, a broadband router, an access point, a cellular phone, a gaming device, a navigation device, a media device, a laptop computer, a desktop computer, a tablet computer, a wearable computer, a server, a network-attached storage (NAS) device, a smart appliance or other internet of things (IoT) device, wireless earbuds or headphones, a medical device, a vehicle-based communication system, a radio apparatus, and so forth.

The base station 104 communicates with the computing device 102 via the wireless link 106, which can be implemented as any suitable type of wireless link. Although depicted as a tower of a cellular network, the base station 104 can represent or be implemented as another device, such as another computing device (e.g., another smartphone), a satellite, a server device, a terrestrial television broadcast tower, an access point, a peer-to-peer device, a mesh network node, and so forth. Therefore, the computing device 102 may communicate with the base station 104 or another device via a wireless connection.

The wireless link 106 can include a downlink of data or control information communicated from the base station 104 to the computing device 102, an uplink of other data or control information communicated from the computing device 102 to the base station 104, or both a downlink and an uplink. The wireless link 106 can be implemented using any suitable communication protocol or standard, such as 2nd-generation (2G), 3rd-generation (3G), 4th-generation (4G), or 5th-generation (5G) cellular; IEEE 802.11 (e.g., Wi-Fi®); IEEE 802.15 (e.g., Bluetooth®); IEEE 802.16 (e.g., WiMAX®); and so forth. In some implementations, the wireless link 106 may wirelessly provide power and the base station 104 or the computing device 102 may comprise a power source.

As shown, the computing device 102 includes an application processor 108 and a computer-readable storage medium 110 (CRM 110). The application processor 108 can include any type of processor, such as a multi-core processor, that executes processor-executable code stored by the CRM 110. The CRM 110 can include any suitable type of data storage media, such as volatile memory (e.g., random access memory (RAM)), non-volatile memory (e.g., Flash memory), optical media, magnetic media (e.g., disk), and so forth. In the context of this disclosure, the CRM 110 is implemented to store instructions 112, data 114, and other information of the computing device 102, and thus does not include transitory propagating signals or carrier waves.

The computing device 102 can also include input/output ports 116 (I/O ports 116) and a display 118. The I/O ports 116 enable data exchanges or interaction with other devices, networks, or users. The I/O ports 116 can include serial ports (e.g., universal serial bus (USB) ports), parallel ports, audio ports, infrared (IR) ports, user interface ports such as a touchscreen, and so forth. The display 118 presents graphics of the computing device 102, such as a user interface associated with an operating system, program, or application. Alternatively or additionally, the display 118 can be implemented as a display port or virtual interface, through which graphical content of the computing device 102 is presented.

A wireless transceiver 120 of the computing device 102 provides connectivity to respective networks and other electronic devices connected therewith. The wireless transceiver 120 can facilitate communication over any suitable type of wireless network, such as a wireless local area network (WLAN), peer-to-peer (P2P) network, mesh network, cellular network, ultra-wideband (UWB) network, wireless wide-area-network (WWAN), and/or wireless personal-area-network (WPAN). In the context of the example environment 100, the wireless transceiver 120 enables the computing device 102 to communicate with the base station 104 and networks connected therewith. However, the wireless transceiver 120 can also enable the computing device 102 to communicate "directly" with other devices or networks.

The wireless transceiver 120 includes circuitry and logic for transmitting and receiving communication signals via an antenna 122. Components of the wireless transceiver 120 can include amplifiers, switches, mixers, filters, analog-to-digital converters, digital-to-analog converters, and so forth for conditioning the communication signals (e.g., for generating or processing signals). The wireless transceiver 120 can also include logic to perform operations such as synthesis, encoding, decoding, modulation, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains). In general, the wireless transceiver 120 processes data and/or signals associated with communicating data of the computing device 102 via the antenna 122.

In the example shown in FIG. 1, the computing device 102 includes at least one modem 124. The modem 124, which can be implemented as a processor, controls the wireless transceiver 120 and enables wireless communication to be performed. The modem 124 can include a portion of the CRM 110 or can access the CRM 110 to obtain computer-readable instructions. The modem 124 can include baseband circuitry to perform analog-to-digital conversion, digital-to-analog conversion, Fourier transforms, gain correction, skew correction, frequency translation, encoding, decoding, modulation, demodulation, and so forth. The modem 124 can provide communication data to the wireless transceiver 120 for transmission. The modem 124 can also process a baseband version of a signal obtained from the wireless transceiver 120 to generate data, which can be provided to other parts of the computing device 102 via a communication interface. Although the modem 124 and the wireless transceiver 120 are depicted separately in FIG. 1, other implementations of the wireless transceiver 120 can include the modem 124. In this case, the modem 124 can be considered a component of the wireless transceiver 120.

The wireless transceiver 120 can be implemented using a variety of different types of transceivers, including a polar transceiver 126 or a Cartesian transceiver 128. In general, the wireless transceiver 120 can perform quadrature amplitude modulation 130. Quadrature amplitude modulation 130 represents a combination of amplitude modulation and phase modulation. For purposes of zero-crossing-avoidance encoding, the quadrature amplitude modulation 130 refers to types of modulation schemes that allow for zero-crossing conditions. Example types of modulation schemes include four-level quadrature amplitude modulation (4-QAM) (or quadrature phase-shift keying (QPSK)), sixteen-level quadrature amplitude modulation (16-QAM), 256-level quadrature amplitude modulation (256-QAM), and so forth.

The zero-crossing conditions can degrade adjacent-channel-power and/or error-vector-magnitude performance of some types of the wireless transceivers 120, such as the polar transceiver 126. Example zero-crossing conditions are further described with respect to FIG. 5.

Figure 2:
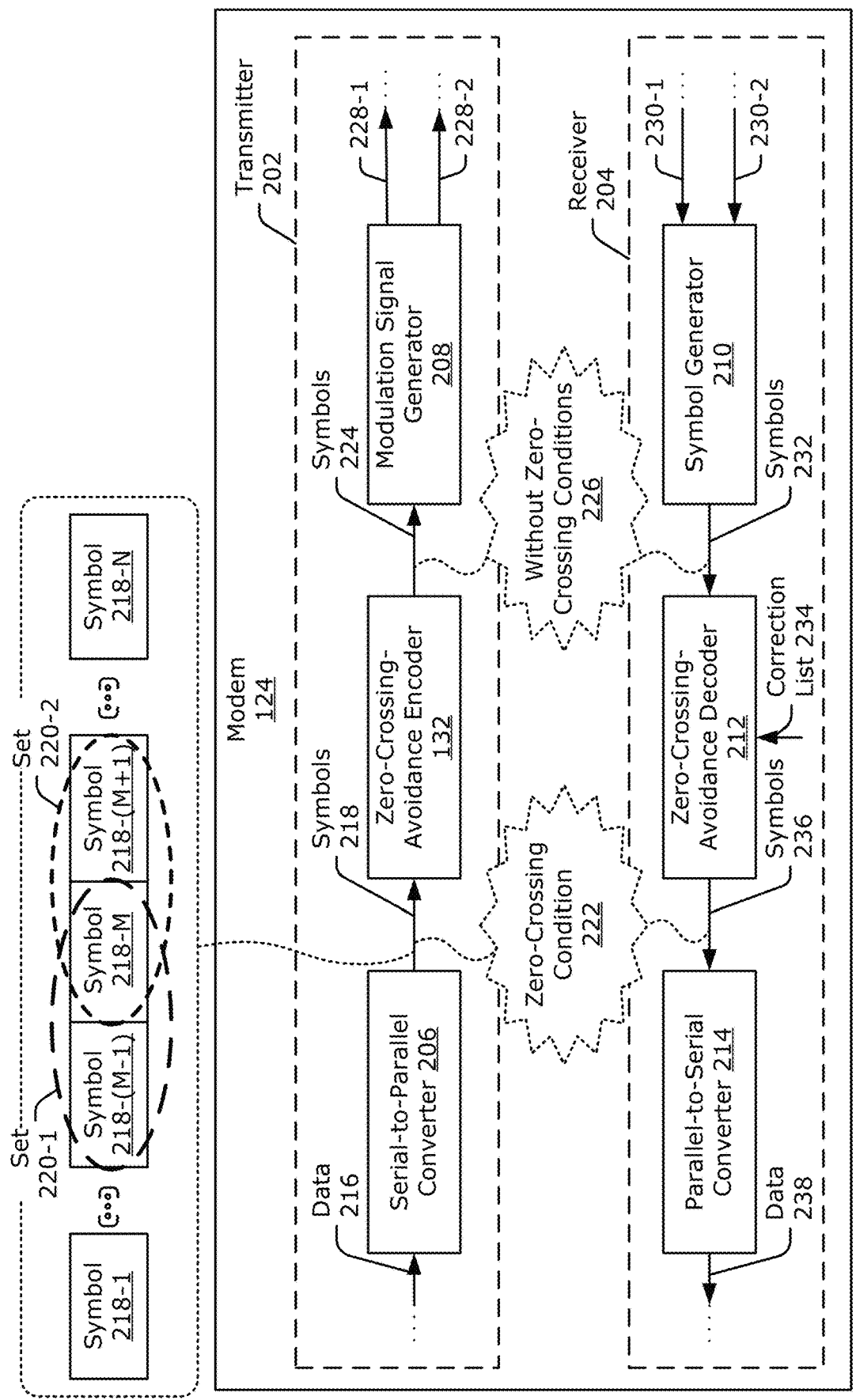
FIG. 2 illustrates an example modem that implements zero-crossing-avoidance encoding for quadrature amplitude modulation.

To avoid the zero-crossing conditions, the modem 124 can perform aspects of zero-crossing-avoidance encoding for quadrature amplitude modulation 130. In example implementations, the modem 124 includes a zero-crossing-avoidance encoder 132, which modifies symbols associated with quadrature amplitude modulation 130 to avoid the zero-crossing condition. The zero-crossing-avoidance encoder 132 can be incorporated in or realized using software, firmware, hardware, fixed logic circuitry, or combinations thereof. Additionally or alternatively, the modem 124 can include a zero-crossing-avoidance decoder (as shown in FIG. 2). The zero-crossing-avoidance encoder 132 and the zero-crossing-avoidance decoder are further described with respect to FIG. 2.

In general, the zero-crossing-avoidance encoding scheme enables the zero-crossing condition to be circumvented, which enables the wireless transceiver 120 to utilize quadrature amplitude modulation 130 in a manner that can satisfying adjacent-channel-power and error-vector-magnitude limits. The modem 124 and the wireless transceiver 120 are further described with respect to FIGS. 2 and 3, respectively.

FIG. 2 illustrates an example modem 124 that implements aspects of zero-crossing-avoidance encoding for quadrature amplitude modulation. In the depicted configuration, the modem 124 includes components associated with part of a transmitter 202 (or a transmit path) and components associated with part of a receiver 204 (or a receive path). These components are associated with digital portions of the transmitter 202 or the receiver 204. Although not shown in FIG. 2, the transmitter 202 and the receiver 204 can include other components that are implemented as part of the wireless transceiver 120, as further described with respect to FIG. 3. Generally speaking, the components of the transmitter 202 and the receiver 204 that are implemented as part of the modem 124 can be incorporated in or realized using software, firmware, hardware, fixed logic circuitry, or combinations thereof. In example implementations, one or more of these components are implemented using a processor that is formed by an integrated circuit or memory, which can be part of a system-on-chip.

The transmitter 202 is shown to include at least one serial-to-parallel converter 206, at least one zero-crossing-avoidance encoder 132, and at least one modulation signal generator 208. The modulation signal generator 208 can include components such as a Cartesian-to-Polar converter and/or a splitter. The receiver 204 includes at least one symbol generator 210, at least one zero-crossing-avoidance decoder 212, and at least one parallel-to-serial converter 214.

During transmission, the modem 124 passes data 216 to the serial-to-parallel converter 206. The data 216 includes a stream or sequence of information bits that is to be transmitted using the wireless transceiver 120. The serial-to-parallel converter 206 generates symbols 218 associated with quadrature amplitude modulation 130. For example, the symbols 218 include symbols 218-1 . . . 218-(M−1), 218-M, 218-(M+1) . . . 218-N, where N and M represent positive integers. In this example, the variable M has a value between 1 and N.

The symbols 218 have bit lengths that represent the type of quadrature amplitude modulation 130 to be performed by the wireless transceiver 120. For example, each symbol 218 can have two bits in accordance with four-level quadrature amplitude modulation. For sixteen-level quadrature amplitude modulation, each symbol 218 can have four bits.

The symbols 218 can be grouped into multiple sets 220 of two consecutive symbols (or multiple pairs of consecutive symbols). Each symbol (except for the first and last symbols 218-1 and 218-N) is associated with two sets 220. For example, symbols 218-(M−1) and 218-M represent a first set 220-1 of two consecutive symbols 218. Likewise, symbols 218-M and 218-(M+1) represent a second set 220-2 of two consecutive symbols 218. In this case, the symbol 218-M is included as part of the first set 220-1 and the second set 220-2. A zero-crossing condition 222 can be associated with at least one of the multiple sets 220 of two consecutive symbols 218.

To address this, the zero-crossing-avoidance encoder 132 performs zero-crossing-avoidance encoding to circumvent the zero-crossing condition 222. In particular, the zero-crossing-avoidance encoder 132 generates symbols 224 based on the symbols 218. The symbols 224 are without zero-crossing conditions 226. In other words, each set 220 of two consecutive symbols 224 is not associated with a zero-crossing condition 222. To achieve this, the zero-crossing-avoidance encoder 132 encodes some of the symbols 218 in a manner that avoids the zero-crossing condition 222. For example, the zero-crossing-avoidance encoder 132 can change one of the symbols 218 within the set 220 to have a different symbol state (e.g., a different phase and optionally a different amplitude). This operation is further described with respect to FIGS. 6-2 and 7.

The modulation signal generator 208 accepts the symbols 224 and generates modulation signals 228-1 and 228-2. The modulation signals 228-1 and 228-2 can represent different types of signals depending on the type of wireless transceiver 120. For the polar transceiver 126, the modulation signals 228-1 and 228-2 can represent an amplitude modulation signal and a phase modulation signal. For the Cartesian transceiver 128, the modulation signals 228-1 and 228-2 can represent an in-phase signal and a quadrature signal. In general, the modulation signals 228-1 and 228-2 represent encoded digital signals that enable the wireless transceiver 120 to perform quadrature amplitude modulation 130.

During reception, the symbol generator 210 accepts demodulation signals 230-1 and 230-2 from the wireless transceiver 120. The symbol generator 210 generates symbols 232 based on the demodulation signals 230-1 and 230-2. The symbols 232 have no zero-crossing conditions 226. The zero-crossing-avoidance decoder 212 accepts the symbols 232 and a correction list 234, which identifies the symbols 232 that have been modified using zero-crossing-avoidance encoding. With the correction list 234, the zero-crossing-avoidance decoder 212 generates the symbols 236 based on the symbols 232. In particular, the zero-crossing-avoidance decoder 212 recovers the symbols 236 by reversing the zero-crossing-avoidance encoding. At least one pair of the symbols 236 is associated with the zero-crossing condition 222. The parallel-to-serial-converter 214 generates data 238 based on the symbols 236. The data 238 includes a stream or sequence of information bits. The modem 124 can pass the data 238 to the application processor 108 or another component of the modem 124. The transmission of the data 216 via the wireless transceiver 120 and the reception of the data 238 via the wireless transceiver 120 are further described with respect to FIG. 3.

Figure 3:
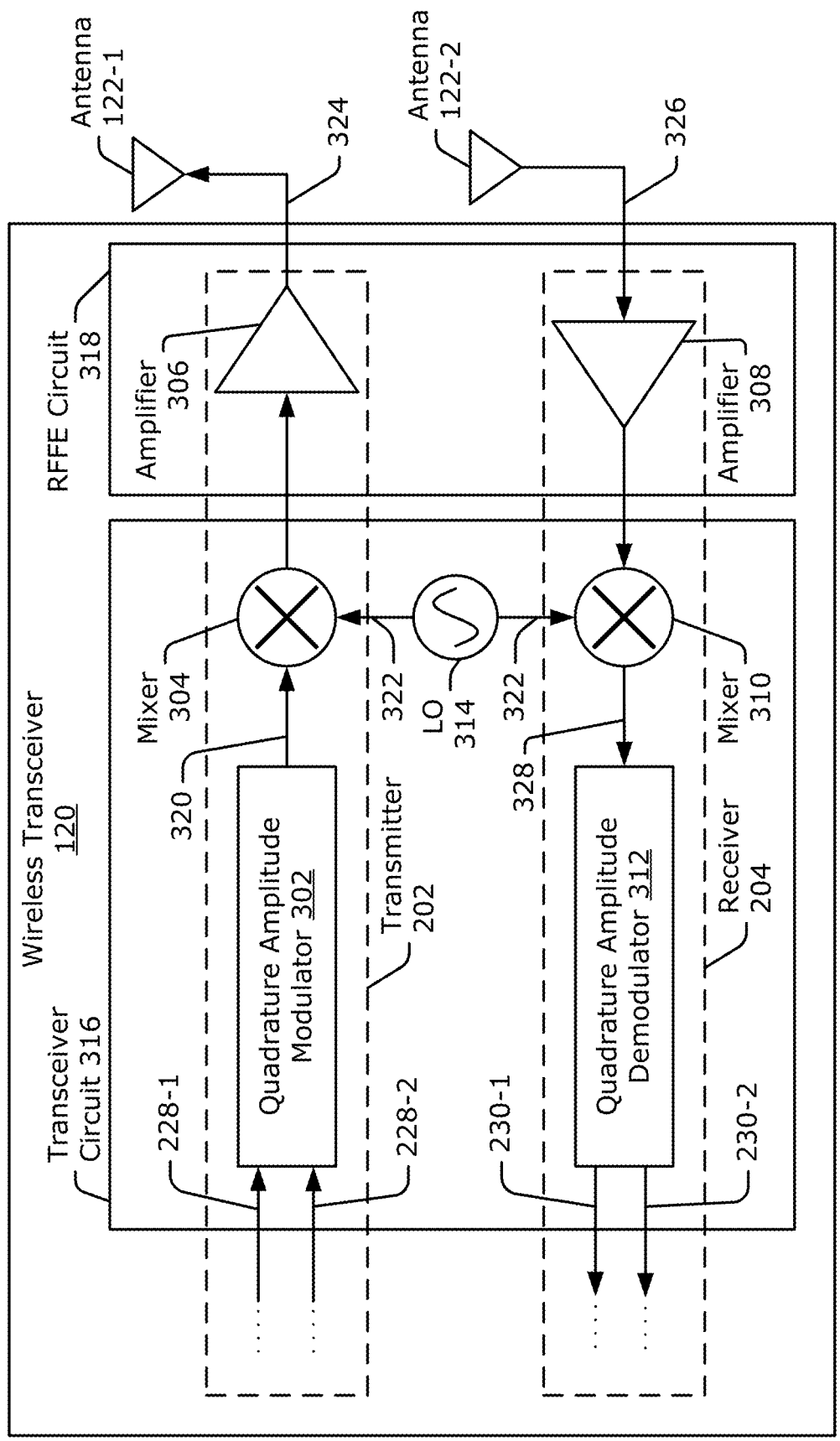
FIG. 3 illustrates an example wireless transceiver that performs quadrature amplitude modulation.

FIG. 3 illustrates an example wireless transceiver 120. In the depicted configuration, the wireless transceiver 120 includes components that are associated with another part of the transmitter 202 and the receiver 204. These components are associated with analog portions of the transmitter 202 or the receiver 204. The transmitter 202 and the receiver 204 are respectively coupled to a first antenna 122-1 and a second antenna 122-2. In other implementations, the transmitter 202 and the receiver 204 can be connected to a same antenna 122 through a duplexer (not shown). The transmitter 202 is shown to include at least one quadrature amplitude modulator 302, at least one mixer 304, and at least one amplifier 306 (e.g., a power amplifier). The receiver 204 includes at least one amplifier 308 (e.g., a low-noise amplifier), at least one mixer 310, and at least one quadrature amplitude demodulator 312.

The wireless transceiver 120 can also include a local oscillator 314 (LO 314), which is coupled to the mixers 304 and 310. In some implementations, the mixers 304 and 310 can be integrated as part of the quadrature amplitude modulator 302 and quadrature amplitude demodulator 312, respectively. In this case, the quadrature amplitude modulator 302 and quadrature amplitude demodulator 312 can perform frequency upconversion and frequency downconversion, respectively. Although not explicitly shown, the wireless transceiver 120 can include other components, such as a digital-to-analog converter, an analog-to-digital converter, a phase shifter, a filter, and a switch.

In some implementations, the wireless transceiver 120 is implemented using multiple circuits (e.g., multiple integrated circuits), such as a transceiver circuit 316 and a radio-frequency front-end (RFFE) circuit 318 (RFFE circuit 318). As such, the components that form the transmitter 202 and the receiver 204 are distributed across these circuits. In FIG. 3, the transceiver circuit 316 includes the quadrature amplitude modulator 302 of the transmitter 202, the mixer 304 of the transmitter 202, the mixer 310 of the receiver 204, and the quadrature amplitude demodulator 312 of the receiver 204. The radio-frequency front-end circuit 318 includes the amplifier 306 of the transmitter 202 and the amplifier 308 of the receiver 204.

In other implementations, the quadrature amplitude modulator 302 and/or the quadrature amplitude demodulator 312 (or some components thereof) are implemented in another circuit that is separate from the transceiver circuit 316 and/or implemented in the radio-frequency front-end circuit 318. Optionally, the quadrature amplitude modulator 302 and/or the quadrature amplitude demodulator 312 (or some components thereof) can be implemented in the modem 124.

During transmission, the quadrature amplitude modulator 302 accepts the modulation signals 228-1 and 228-2 from the modem 124 and generates a transmit signal 320, which is modulated in accordance with quadrature amplitude modulation 130. The modulation signals 228-1 and 228-2 shown in FIG. 3 can be analog versions of the digital signals represented in FIG. 2. The transmit signal 320 can represent an analog signal. The mixer 304 upconverts the transmit signal 320 using a local oscillator (LO) signal 322 provided by the local oscillator 314. The amplifier 306 amplifies the upconverted transmit signal 320. The transmitter 202 passes a signal 324 to the antenna 122-1 for transmission. The signal 324 represents a radio-frequency transmit signal associated with wireless communication. In some example implementations, the signal 324 can be associated with Bluetooth®.

During reception, the antenna 122-2 receives a radio-frequency receive signal 326 and passes the radio-frequency receive signal 326 to the receiver 204. The amplifier 308 of the receiver 204 amplifies the radio-frequency receive signal 326, and the mixer 310 downconverts the amplified radio-frequency receive signal 326 using the local oscillator signal 322 to generate signal 328. The quadrature amplitude demodulator 312 demodulates the signal 328 to generate demodulation signals 230-1 and 230-2. The demodulation signals 230-1 and 230-2 can represent polar signals associated with the polar transceiver 126 (e.g., amplitude and phase) or in-phase and quadrature signals associated with the Cartesian transceiver 128. The wireless transceiver 120 passes the demodulation signals 230-1 and 230-2 to the modem 124, as shown in FIG. 2.

FIG. 3 illustrates one example configuration of the wireless transceiver 120. Other configurations of the wireless transceiver 120 can support multiple frequency bands and share an antenna 122 across multiple transceivers. One of ordinary skill in the art can appreciate the variety of other configurations for which the wireless transceiver 120 can be implemented. For example, the wireless transceiver 120 can be implemented as the polar transceiver 126 or the Cartesian transceiver 128. The wireless transceiver 120 can also be implemented as a direct-conversion transceiver or a super-heterodyne transceiver. Some implementations of the computing device 102 can implement portions of the quadrature amplitude modulator 302 and/or the quadrature amplitude demodulator 312 within the modem 124. Aspects of quadrature amplitude modulation 130 are further described with respect to FIG. 4.

Figure 4:
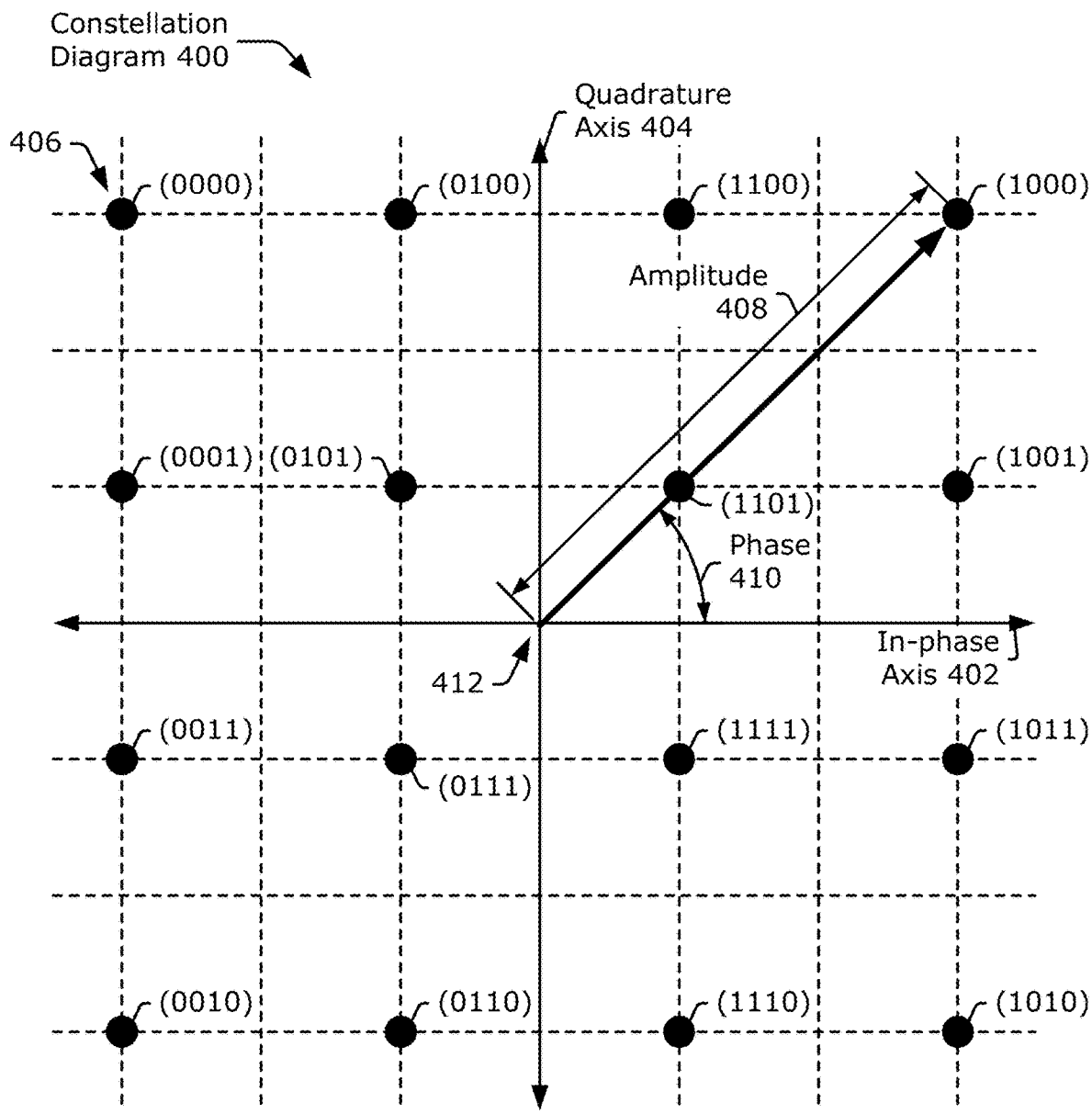
FIG. 4 illustrates an example constellation diagram associated with sixteen-level quadrature amplitude modulation.

FIG. 4 illustrates an example constellation diagram 400 (or polar plot) associated with sixteen-level quadrature amplitude modulation. The constellation diagram 400 is depicted with respect to an in-phase axis 402 and a quadrature axis 404. Points (e.g., dots or circles) within the constellation diagram 400 represent different symbol states 406 associated with sixteen-level quadrature amplitude modulation. Each symbol state includes four information bits in accordance with sixteen-level quadrature amplitude modulation. Although described with respect to sixteen-level quadrature amplitude modulation, the techniques for zero-crossing-avoidance encoding can be applied to any type of quadrature amplitude modulation that can invoke a zero-crossing condition 222.

Each symbol state 406 can be represented by a unique complex number. For example, each symbol state 406 can be associated with an in-phase value (e.g., a real number) and a quadrature value (e.g., an imaginary number). Alternatively, each symbol state 406 can be represented by an amplitude 408 and a phase 410. The amplitude 408 represents a distance between the symbol state 406 and an origin 412 of the constellation diagram 400. The origin 412 is a point in which the in-phase and quadrature values are equal to zero. The phase 410 represents an angle between the symbol state 406 and the positive portion of the in-phase axis 402 (e.g., the portion of the in-phase axis 402 that is to the right of the origin 412).

Each symbol that is carried by the radio-frequency signal 324 or 326 represents one of the symbol states 406 within the constellation diagram 400. The symbol states 406 of the constellation diagram 400 represent ideal versions of the transmitted or received symbols. In reality, the transmitted or received symbols can have an amplitude and/or phase that varies by some amount from the amplitude 408 and/or phase 410 of the intended symbol state 406. This variation can be caused by the components within the wireless transceiver 120 and/or by non-ideal conditions within the environment. For instance, noise, truncation, carrier leakage, or phase noise can cause a symbol to vary by some amount from the intended symbol state 406.

Throughout the disclosure, a symbol carried by the radio-frequency signals 324 or 326 or a symbol represented by 218, 224, 232, and 236 can be described as being approximately equal to (or represented of) a particular symbol state 406. In this case, the term "approximately" can account for some variations, as described above. In general, the symbol can represent a particular symbol state 406 if a receiving entity can associate the symbol with the appropriate symbol state 406. The amount of variation that can be covered by the term "approximately" can depend on the distance between neighboring symbol states 406 within the constellation diagram 400. Different levels of quadrature amplitude modulation 130 can allow for different amounts of variation. Other aspects of the constellation diagram 400 are further described with respect to FIG. 5.

Figure 5:
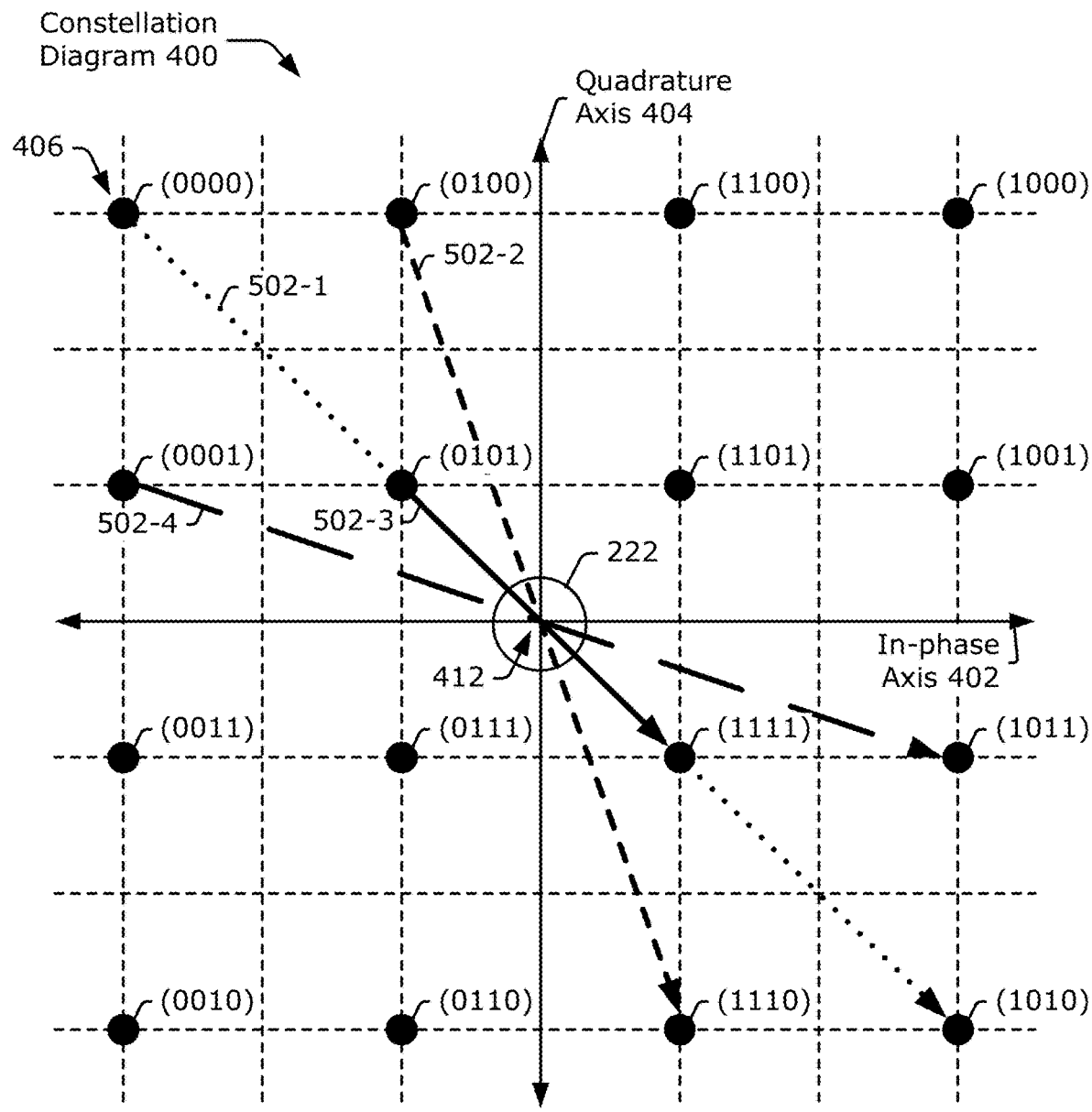
FIG. 5 illustrates example zero-crossing conditions associated with sixteen-level quadrature amplitude modulation.

FIG. 5 illustrates example zero-crossing conditions 222 in the constellation diagram 400. Multiple signal trajectories 502 (e.g., signal trajectories 502-1, 502-2, 502-3, and 502-4) are shown in FIG. 5. A signal trajectory 502 (or state transition) represents a transition from a first symbol state 406 to a second symbol state 406. A zero-crossing condition 222 is associated with a signal trajectory 502 that passes through the origin 412 of the constellation diagram 400. At the origin 412, the amplitude 408 of the signal trajectory 502 is zero. Explained another way, two symbol states 406 are associated with a zero-crossing condition 222 if an absolute value of a phase difference between the two symbol states 406 is equal to 180 degrees. Considering two consecutive symbols that represent these two symbol states, a zero-crossing condition 222 can occur if an absolute value of a phase difference between these consecutive symbols is approximately equal to 180 degrees. In general, the term "approximately" can allow for some variation between the symbols and the representative symbol states 406. In example implementations, "approximately" can mean that the absolute value of the phase difference can be within +1 degrees of 180 degrees (e.g., within +0.5 degrees of 180 degrees).

In the constellation diagram 400, example signal trajectories 502 are shown between four symbol states 406 in the upper-left quadrant of the constellation diagram 400 and four symbol states 406 in the lower-right quadrant of the constellation diagram 400. The signal trajectories 502 are represented by a line with an arrowhead. An end of the line that is opposite the arrowhead is positioned at a first symbol state 406, which can represent a state of a first symbol (e.g., a beginning symbol) within the set 220 of two consecutive symbols. The arrowhead is positioned at a second symbol state 406, which can represent a state of a second symbol (e.g., an ending symbol) within the set 220 of two consecutive symbols. Within the set 220, the first symbol precedes the second symbol.

The signal trajectories 502-1, 502-2, 502-3, and 502-4 invoke zero-crossing conditions 222. The first signal trajectory 502-1 is between symbol states 406 with binary values (0000) and (1010). The second signal trajectory 502-2 is between symbol states 406 with binary values (0100) and (1110). A third signal trajectory 502-3 is between symbol states 406 with binary values (0101) and (1111). A fourth signal trajectory 502-4 is between symbol states 406 with binary values (0001) and (1011). Although not explicitly shown, there are two additional signal trajectories 502 between symbol states 406 in the upper-left quadrant and the lower-right quadrant that invoke zero-crossing conditions 222. These include a signal trajectory 502 between symbol states 406 with binary values (0000) and (1111) and another signal trajectory 502 between symbol states 406 with binary values (0101) and (1010).

For 16-QAM, there are six possible signal trajectories 502 that begin within each quadrant of the constellation diagram 400 and invoke a zero-crossing condition 222. As such, there are 24 signal trajectories 502 out of 256 total signal trajectories 502 that can cause a zero-crossing condition 222. The remaining 232 signal trajectories 502 do not invoke a zero-crossing condition 222 (e.g., avoid a zero-crossing condition 222).

Figures 1, 6:
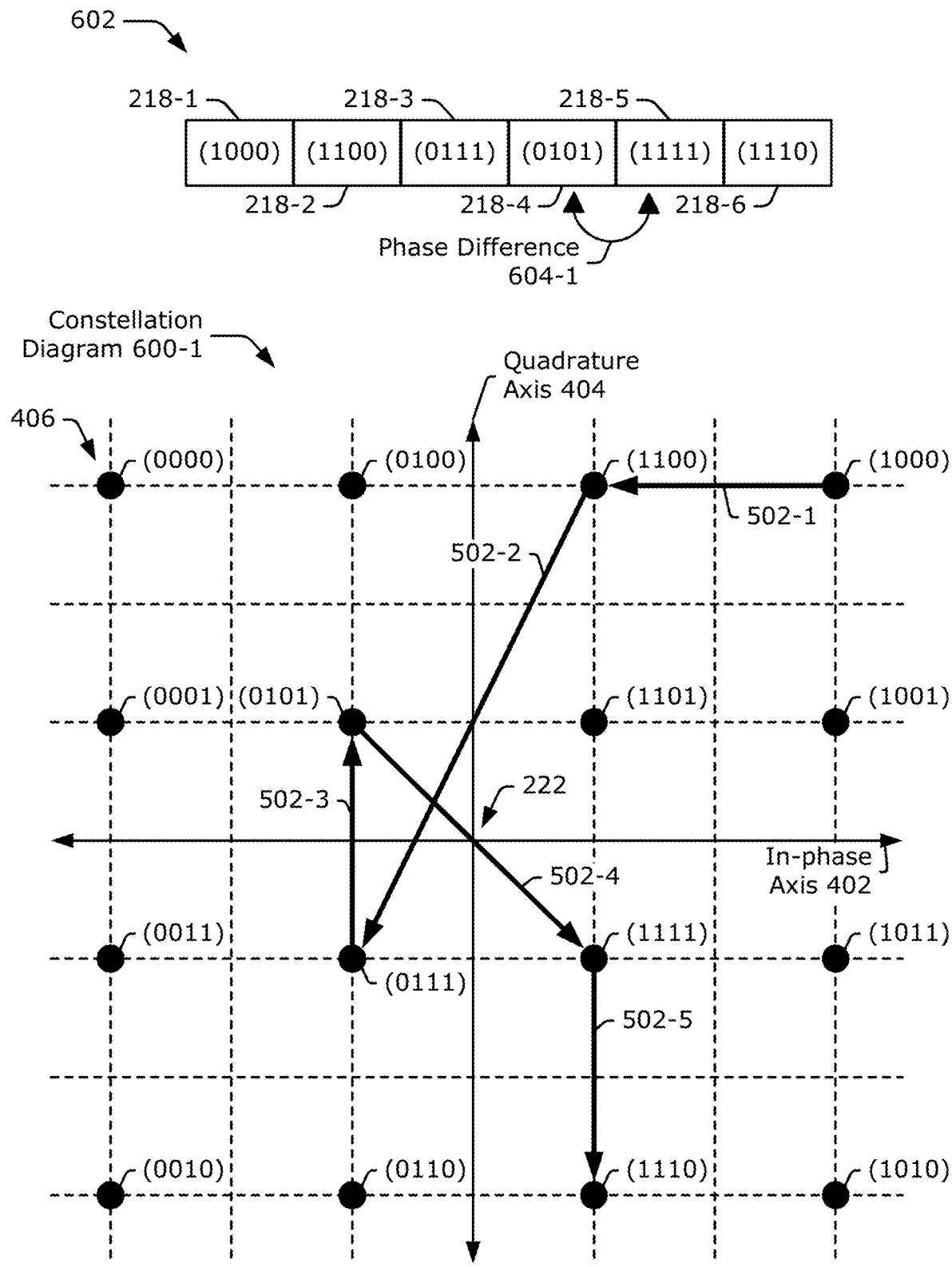
Figures 2, 6:
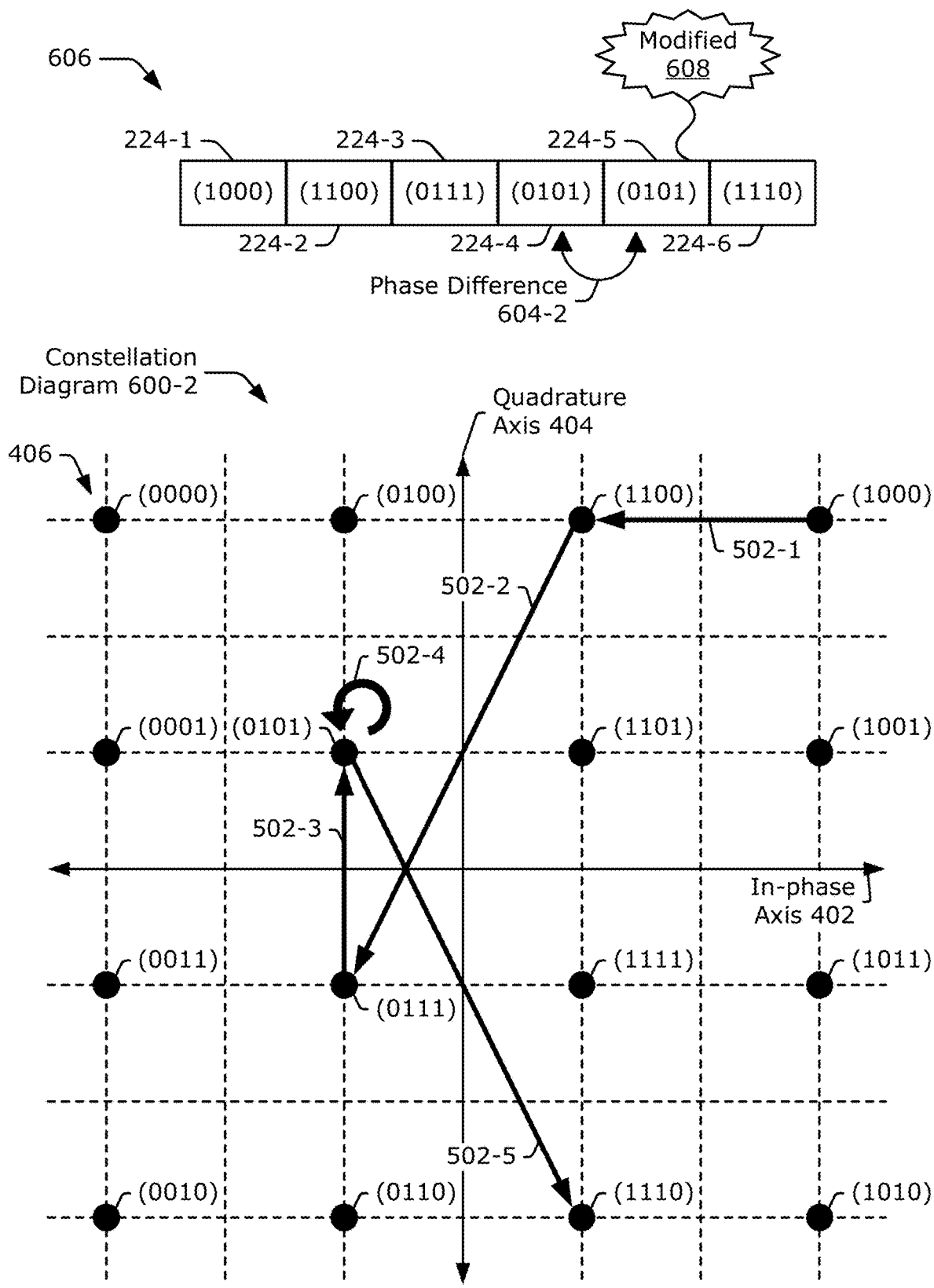

The techniques associated with zero-crossing-avoidance encoding modify symbol states 406 of the symbols 218 in a manner that avoids any signal trajectories 502 associated with a zero-crossing condition 222, as further described with respect to FIGS. 6-1 and 6-2.

FIG. 6-1 illustrates an example sequence 602 of symbols 218 with a zero-crossing condition 222. The serial-to-parallel converter 206 can generate the sequence 602 of symbols 218 based on the data 216, as shown in FIG. 2. In this example, the sequence 602 includes symbols 218-1, 218-2, 218-3, 218-4, 218-5, and 218-6. The symbols 218-1 to 218-6 are ordered in time with symbol 218-1 occurring first and symbol 218-6 occurring last. In other words, the symbol 218-1 precedes the symbol 218-2, the symbol 218-2 precedes the symbol 218-3, the symbol 218-3 precedes the symbol 218-4, the symbol 218-4 precedes the symbol 218-5, and the symbol 218-5 precedes the symbol 218-6.

The symbols 218-1 to 218-6 can be mapped to corresponding symbol states 406 based on the binary values. The symbol 218-1 is represented by the symbol state 406 having a binary value of (1000). The symbol 218-2 is represented by the symbol state 406 having a binary value of (1100). The symbols 218-3 and 218-4 are represented by symbol states 406 having binary values of (0111) and (0101), respectively. The symbols 218-5 and 218-6 are represented by symbol states 406 having binary values of (1111) and (1110), respectively.

The constellation diagram 600-1 illustrates the signal trajectories 502 between consecutive symbols 218 within the sequence 602. A first signal transition 502-1 occurs between the symbol states 406 associated with symbols 218-1 and 218-2. The symbols 218-1 and 218-2 represent a first set 220 of consecutive symbols 218 within the sequence 602. A second signal transition 502-2 occurs between the symbol states 406 associated with symbols 218-2 and 218-3. The symbols 218-2 and 218-3 represent a second set 220 of consecutive symbols 218 within the sequence 602. A third signal transition 502-3 occurs between symbol states 406 associated with symbols 218-3 and 218-4. The symbols 218-3 and 218-4 represent a third set 220 of consecutive symbols 218 within the sequence 602. A fourth signal transition 502-4 occurs between symbol states 406 associated with symbols 218-4 and 218-5. The symbols 218-4 and 218-5 represent a fourth set 220 of consecutive symbols 218 within the sequence 602. A fifth signal transition 502-5 occurs between symbol states 406 associated with symbols 218-5 and 218-6. The symbols 218-5 and 218-6 represent a fifth set 220 of consecutive symbols 218 within the sequence 602.

The signal transitions 502-1, 502-2, 502-3, and 502-5 are not associated with the zero-crossing condition 222. This is because absolute values of the phase differences between the corresponding pairs of consecutive symbols 218 is substantially different than 180 degrees. In general, the term "substantially different" means the symbol states 406 represented by the two consecutive symbols 218 have a phase difference that is not equal to 180 degrees (e.g., the symbol states 406 do not have opposite phases). For some levels of quadrature amplitude modulations 130, the term "substantially different" can mean that the absolute value of the phase difference between the corresponding pairs of consecutive symbols 218 varies by at least ±0.5 degrees from 180 degrees (e.g., varies by ±1 degree, ±2 degrees, ±5 degrees, ±10 degrees, or more). The amount of variation associated with the term "substantially different" can depend on the type of quadrature amplitude modulation 130. In general, the amount of variation can be larger for lower-level quadrature amplitude modulations (e.g., 4-QAM) and smaller for higher-level quadrature amplitude modulations (e.g., 256-QAM).

In contrast, the signal transition 502-4 is associated with a zero-crossing condition 222. This is because an absolute value of a phase difference 604-1 between the symbols 218-4 and 218-5 is approximately equal to 180 degrees. In general, the term "approximately" means can allow for some variation between the symbols and the representative symbol states 406. In example implementations, "approximately" can mean that the absolute value of the phase difference can be within +1 degrees of 180 degrees (e.g., within +0.5 degrees of 180 degrees). Explained another way, the symbol states 406 represented by the two consecutive symbols 218 have a phase difference that is equal to 180 degrees. To avoid the zero-crossing condition 222 associated with the fourth signal trajectory 502-4, the computing device 102 can employ zero-crossing-avoidance encoding, as further described with respect to FIG. 6-2.

FIG. 6-2 illustrates an example sequence 606 of symbols 224, which are encoded using zero-crossing-avoidance encoding. The zero-crossing-avoidance encoder 132 generates the sequence 606 of symbols 224 based on the sequence 602 of symbols 218 provided by the serial-to-parallel converter 206. In this example, the sequence 606 includes symbols 224-1, 224-2, 224-3, 224-4, 224-5, and 224-6. The symbols 224-1 to 224-6 are ordered in time with symbol 224-1 occurring first and symbol 224-6 occurring last. In other words, the symbol 224-1 precedes the symbol 224-2, the symbol 224-2 precedes the symbol 224-3, the symbol 224-4 precedes the symbol 224-5, and the symbol 224-5 precedes the symbol 224-6. The symbols 224-1 to 224-6 represent versions of the symbols 218-1 to 218-6 of FIG. 6-1 that have passed through the zero-crossing-avoidance encoder 132. The symbols 224-1 to 224-6 may or may not have similar symbol states 406 as the corresponding symbols 218-1 to 218-6, as further explained below.

With zero-crossing-avoidance encoding, symbol pairs that do not cause a zero-crossing condition 222 are left unmodified. As such, symbols 224-1 to 224-4 have the same symbol states 406 as symbols 218-1 to 218-4 of FIG. 6-1. To avoid the zero-crossing condition 222 associated with signal trajectory 502-4 in FIG. 6-1, the symbol 224-5 is modified 608 relative to the symbol 218-5. Explained another way, the symbol 224-5 represents an encoded version of the symbol 218-5 that avoids the zero-crossing condition 222. In particular, the symbol 224-5 has a symbol state 406 with a different phase 410 than the symbol state 406 associated with the symbol 218-5. The modified phase 410 causes an absolute value of a phase difference 604-2 between the symbols 224-4 and 224-5 to be substantially different than 180 degrees. As explained above, the term "substantially different" can mean that the absolute value of the phase difference between the corresponding pairs of consecutive symbols 218 varies by at least +0.5 degrees from 180 degrees (e.g., varies by #1 degree, +2 degrees, +5 degrees, +10 degrees, or more). The amount of variation associated with the term "substantially different" can depend on the type of quadrature amplitude modulation 130.

There are a variety of ways in which zero-crossing-avoidance encoding can modify the phase 410 of the symbol 218-5 to avoid the zero-crossing condition 222 and generate the symbol 224-5. In one example, the symbol state 406 of the symbol 224-5 is any other symbol state 406 that is not opposite in phase to the symbol state 406 of symbol 224-4. In particular, the symbol state 406 of the symbol 224-5 can be any symbol state 406 except those associated with binary values (1111) and (1010). Optionally, the amplitude 408 of the symbol 218-5 can also be modified.

In a first example, the symbol state 406 of the symbol 224-5 is in a same quadrant of the constellation diagram 600-2 as the symbol state 406 of the symbol 218-5. In this example, the symbol state 406 of the symbol 224-5 is shifted to a neighboring symbol state 406, such as one of the symbol states 406 represented by binary values (1110) or (1011). In a second example, the symbol state 406 of the symbol 224-5 is a different quadrant than the symbol state 406 of the symbol 218-5 and the symbol state 406 of the symbol 224-4. For instance, the symbol state 406 of the symbol 224-5 is in the upper-right quadrant of the constellation diagram 600-2 or the lower-left quadrant of the constellation diagram 600-2. In a third example, the symbol state 406 of the symbol 224-5 is in a same quadrant as the symbol state 406 of the symbol 224-4. In this example, the symbol state 406 of the symbol 224-5 is in the upper-left quadrant of the constellation diagram 600-2.

In the example shown in FIG. 6-2, the symbol state 406 represented by symbol 218-5 is modified 608 to be the symbol state 406 represented by the preceding symbol 224-4. In this manner, the symbol state 406 of the symbol 224-5 has a same amplitude 408 and a same phase 410 as the symbol state 406 of the symbol 224-4. Explained another way, the absolute value of the phase difference 604-2 between the symbol states 406 represented by symbols 224-5 and 224-4 is equal to zero. In this case, the amplitude 408 of the symbol state 406 of the symbol 224-5 is unchanged relative to the amplitude 408 of the symbol state 406 of the symbol 218-5. By adjusting at least the phase 410 of the symbol state 406 of the symbol 224-5 relative to the phase 410 of the symbol state 406 of the symbol 218-5, the zero-crossing condition is avoided in the sequence 606. Aspects of the zero-crossing-avoidance encoding are further described with respect to FIG. 7.

Figure 7:
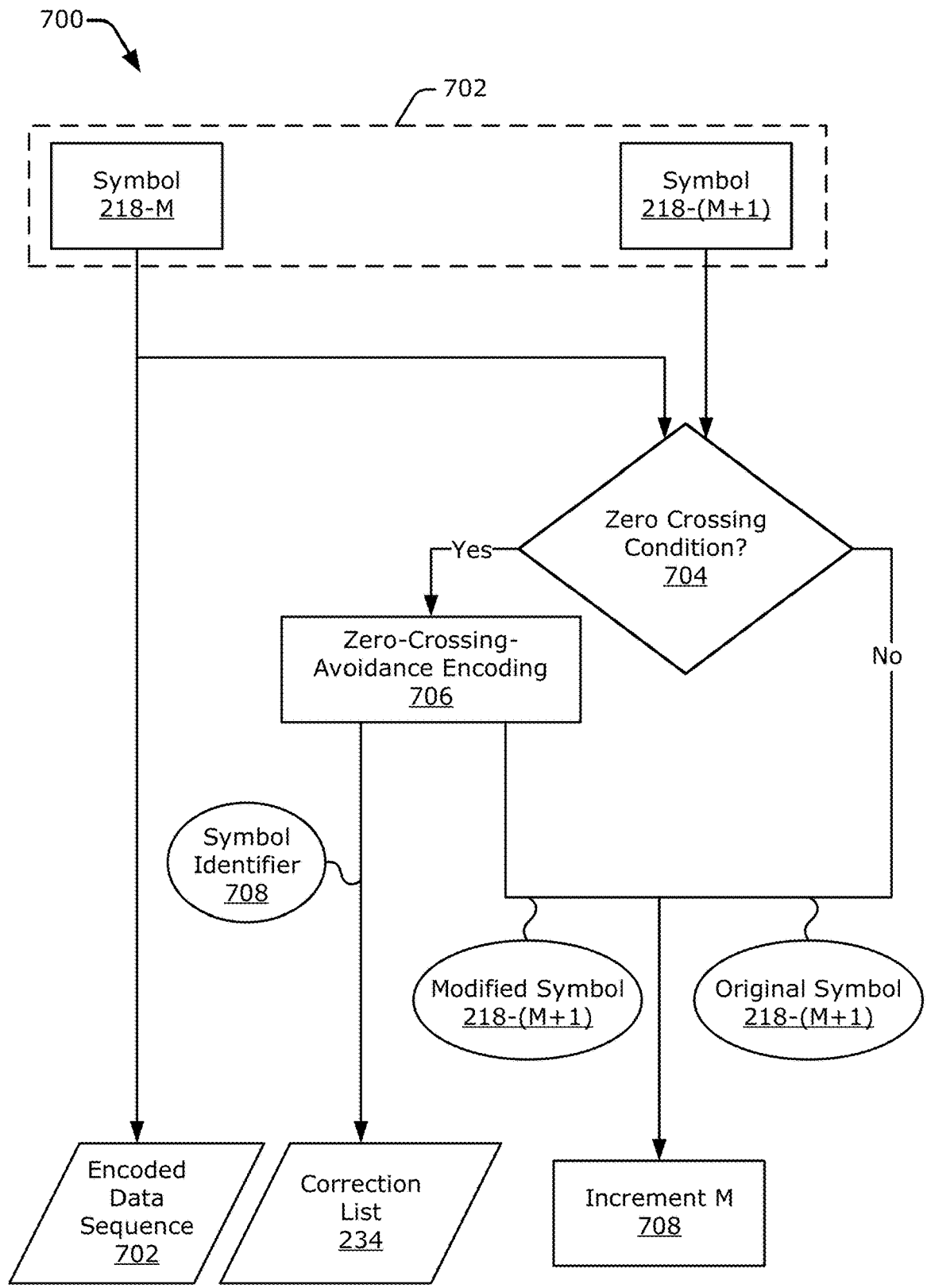
FIG. 7 illustrates an example scheme implemented by a zero-crossing-avoidance encoder.

FIG. 7 illustrates an example scheme 700 implemented by the zero-crossing-avoidance encoder 132. At 702, the zero-crossing-avoidance encoder 132 accepts symbol 218-M and symbol 218-(M+1) from the serial-to-parallel converter 206. The value M represents a positive integer that is incremented between 1 and N−1 by the zero-crossing-avoidance encoder 132. The symbols 218-M and 218-(M+1) represent a set 220 of two consecutive symbols 218 within the sequence 602 (e.g., a pair of consecutive symbols 218 within the sequence 602).

In this example implementation, the zero-crossing-avoidance encoder 132 outputs symbol 218-M as part of an encoded data sequence 702. At 704, the zero-crossing-avoidance encoder 132 determines whether or not the given symbols 218-M and 218-(M+1) are associated with a zero-crossing condition 222. If the symbols 218-M and 218-(M+1) are not associated with a zero-crossing condition 222, the symbol 218-(M+1) is left unchanged. If the symbols 218-M and 218-(M+1) are associated with a zero-crossing condition 222, the zero-crossing-avoidance encoder 132 performs zero-crossing-avoidance encoding at 706.

As part of the zero-crossing-avoidance encoding, at least a phase 410 of the symbol 218-(M+1) is modified or changed such that an absolute value of a phase difference 604 between the symbols 218-M and 218-(M+1) is substantially different than 180 degrees. The amplitude 408 of the symbol 218-(M+1) can optionally be modified. In an example implementation, the zero-crossing-avoidance encoding causes the modified symbol 218-(M+1) to have a same symbol state as the symbol 218-M (e.g., have approximately a same amplitude 408 and a same phase 410 as the symbol 218-M). In another example implementation, the zero-crossing-avoidance encoding causes the symbol 218-(M+1) to represent a symbol state 406 that is in a same quadrant as the symbol state 406 of the symbol 218-M. In this case, the phase 410 of the symbol state 406 represented by the symbol 218-(M+1) can be modified and the amplitude 408 of the symbol state 406 can be left unchanged.

Additionally, the zero-crossing-avoidance encoder 132 updates a correction list 234 based on a symbol identifier 708 associated with the symbol 218-(M+1). The symbol identifier 708 can represent a position of the symbol 218-(M+1) within the sequence 602. In other words, the symbol identifier 708 can represent the value M+1.

In some implementations, the correction list 234 can include additional information to enable the symbol 218-(M+1) to be recovered or decoded by a receiving entity. For example, the correction list 235 can include information regarding the type of zero-crossing-avoidance encoding. A first type of zero-crossing-avoidance encoding can refer to the zero-crossing-avoidance encoder 132 encoding the symbol 218-(M+1) to have a same phase 410 as the symbol 218-M without adjusting the amplitude 408 of the symbol 218-(M+1). A second type of zero-crossing-avoidance encoding can refer to the zero-crossing avoidance encoder 132 encoding the symbol 218-(M+1) to have a same phase 410 as the symbol 218-M and a same amplitude 408 as the symbol 218-M. Other types of zero-crossing-avoidance encodings are also possible, including examples that are described with respect to FIG. 6-2.

At 708, the zero-crossing-avoidance encoder 132 increments M and repeats the process at 702 until M is equal to N. During a subsequent iteration, the previous symbol 218-(M+1) becomes the symbol 218-M. In this case, the symbol 218-M can represent the modified version or the original version of the symbol 218-(M+1) associated with the previous iteration.

Over time, the zero-crossing-avoidance encoder 132 evaluates each pair of consecutive symbols 218 to determine whether or not each pair is associated with a zero-crossing condition 222. If the pair of consecutive symbols 218 is not associated with the zero-crossing condition 222, the second symbol 218 within the pair is left unchanged. If the pair of consecutive symbols 218 is associated with the zero-crossing condition 222, the second symbol 218 is modified to circumvent the zero-crossing condition 222. The unchanged and modified symbols 224 are captured as part of the encoded data sequence 702 and are represented by symbols 224. The zero-crossing-avoidance encoder 132 generates the correction list 234 to identify which symbols 224 within the encoded data sequence 702 were modified by the zero-crossing-avoidance encoding at 706. Aspects of zero-crossing-avoidance encoding are further described with respect to FIG. 8.

Figure 8:
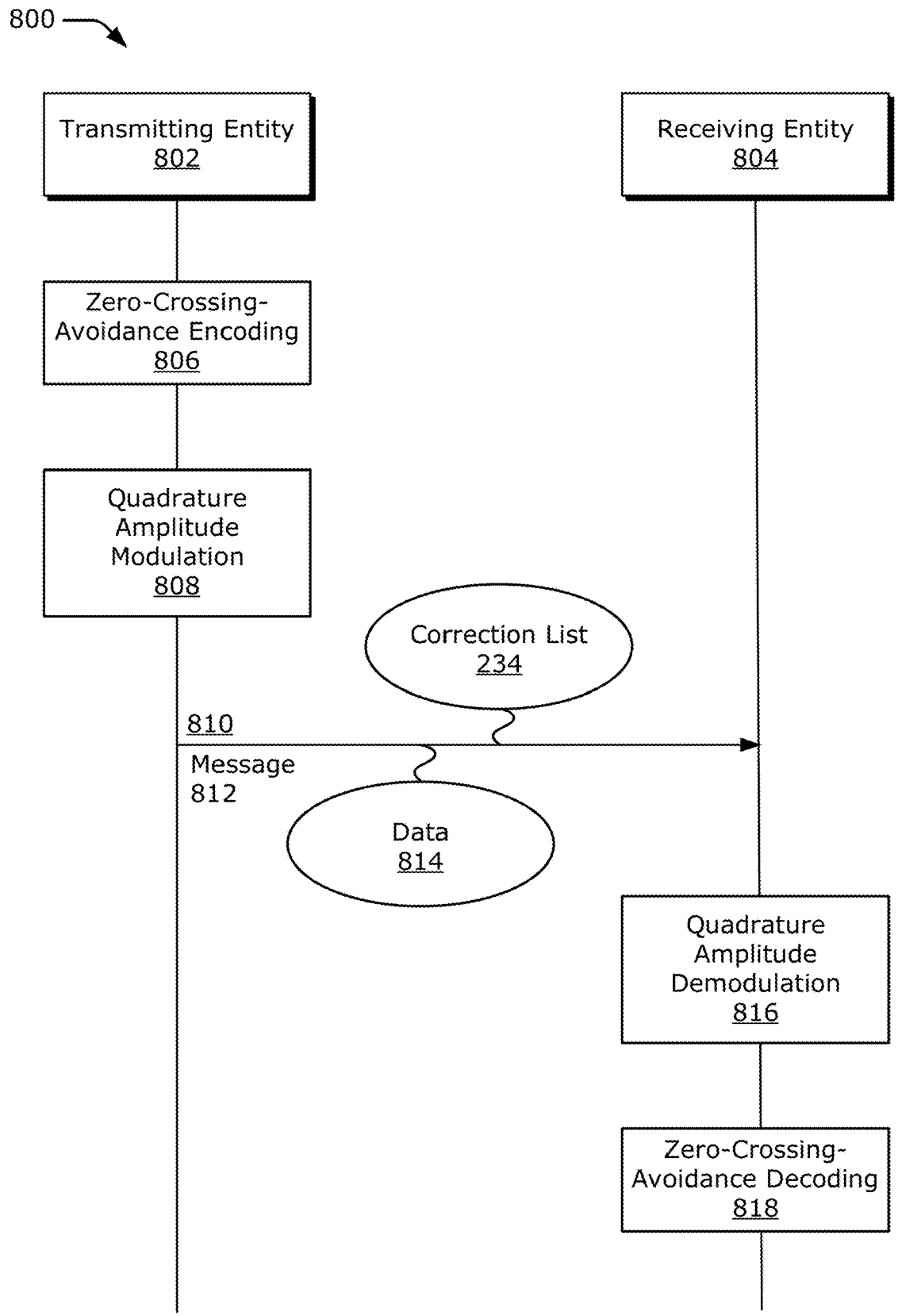
FIG. 8 illustrates an example transaction diagram between a transmitting entity and a receiving entity for implementing zero-crossing-avoidance encoding for quadrature amplitude modulation.

FIG. 8 illustrates an example transaction diagram 800 between a transmitting entity 802 and a receiving entity 804.

The transmitting entity 802 can represent the computing device 102 of FIG. 1. In general, the transmitting entity 802 includes at least the transmitter 202 of FIGS. 2 and 3. The transmitting entity 802 may or may not include the receiver 204 of FIGS. 2 and 3.

The receiving entity 804 can represent the base station 104 of FIG. 1. In general, the receiving entity 804 includes at least the receiver 204 of FIGS. 2 and 3. The receiving entity 804 may or may not include the transmitter 202 of FIGS. 2 and 3. In some example implementations, the transmitting entity 802 represents a wireless earbud and the receiving entity 804 represents another computing device, such as a smartphone.

At 806, the transmitting entity 802 performs zero-crossing-avoidance encoding, as described with respect to FIG. 7. In other words, the transmitting entity 802 generates the symbols 224 (or the encoded data sequence 702) without zero-crossing conditions 226. Explained another way, phase differences within each set 220 of two consecutive symbols 224 are substantially different than 180 degrees.

At 808, the transmitting entity 802 performs quadrature amplitude modulation 130 using the wireless transceiver 120. In example implementations, the wireless transceiver 120 can be a polar transceiver 126 or a Cartesian transceiver 128.

At 810, the transmitting entity 802 transmits a message 812 to the receiving entity 804. The message 812 includes data 814 represented by the symbols 224. The message 812 can also include the correction list 234 to at least identify the symbols 224 that were modified by the zero-crossing-avoidance encoding at 806. Alternatively, the correction list 234 can be communicated using another message that is distinct from the message 812.

The receiving entity 804 receives the message 812. At 816, the receiving entity 804 performs quadrature amplitude demodulation. At 818, the receiving entity 804 performs zero-crossing-avoidance decoding based on the correction list 234. In general, the zero-crossing-avoidance decoding recovers the original symbols 218 that were associated with at least one zero-crossing condition 222. In some implementations, the message 812 can represent a protocol data unit (PDU), as further described with respect to FIG. 9.

Figure 9:
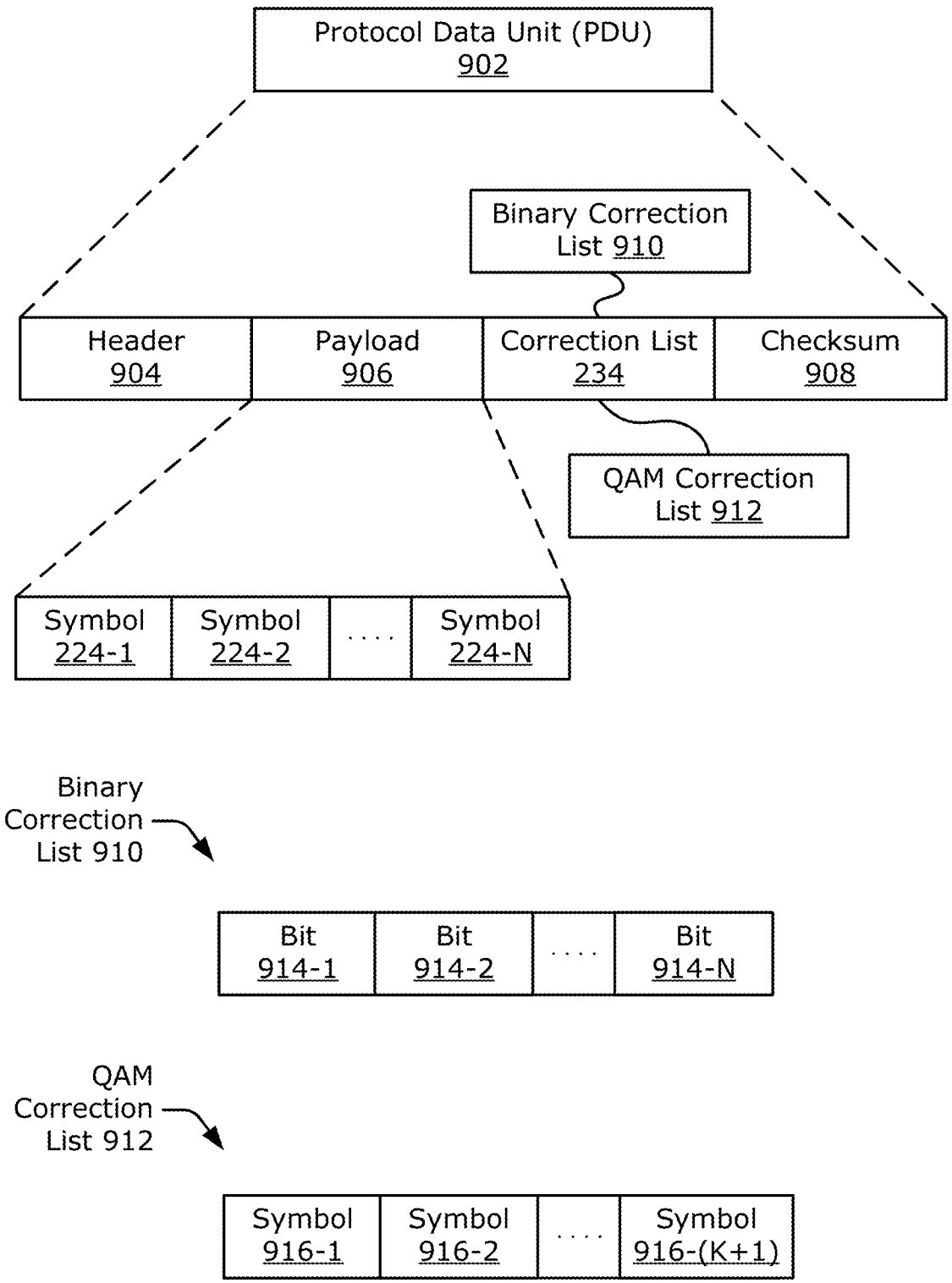
FIG. 9 illustrates an example protocol data unit in accordance with zero-crossing-avoidance encoding for quadrature amplitude modulation.

FIG. 9 illustrates an example protocol data unit 902 in accordance with zero-crossing-avoidance encoding for quadrature amplitude modulation. In an example implementation, the protocol data unit 902 includes a header 904, a payload 906, the correction list 234, and a checksum 908. The header 904 can include information such as a preamble, an access code, or a length of the payload 906. In some implementations, the correction list 234 can be provided as part of the header 904. The payload 906 includes symbols 224-1, 224-2 . . . 224-N, which are encoded using zero-crossing-avoidance encoding. The checksum 908 can include a number that represents a checksum or a codeword associated with a cyclic redundancy check (CRC) for error detection and/or correction.

The correction list 234 can be implemented as a binary correction list 910 or a quadrature-amplitude-modulation correction list 912 (QAM correction list 912). The binary correction list 910 includes bits 914-1, 914-2 . . . 914-N. A quantity of bits within the binary correction list 910 can be equal to the quantity of symbols 224 within the payload 906 (e.g., equal to the value represented by N). Each bit 914 within the binary correction list 910 is associated with one of the symbols 224-1 to 224-N. For example, the bit 914-1 is associated with the symbol 224-1, and the bit 914-N is associated with the symbol 224-N. A value of the bit 914 indicates whether or not the corresponding symbol 224 was modified by the zero-crossing-avoidance encoding. For example, a value of "1" can indicate that the corresponding symbol 224 was modified (e.g., encoded using zero-crossing-avoidance encoding), and a value of "0" can indicate that the corresponding symbol 224 was not modified (e.g., remains unchanged using zero-crossing-avoidance encoding).

The quadrature-amplitude-modulation correction list 912 includes symbols 916-1, 916-2 . . . and 916-(K+1), where K represents a quantity of symbols that are modified within the payload 906. Each symbol 916 represents a position of a symbol 224 within the payload 906 that was modified using the zero-crossing-avoidance encoding. To avoid the zero-crossing condition 222 within the quadrature-amplitude-modulation correction list 912, the positions of the symbols 224 within the payload 906 can be represented using pairs of symbols that avoid the zero-crossing condition 222.

FIGS. 10 and 11 are flow diagrams illustrating example processes 1000 and 1100 for performing aspects of zero-crossing-avoidance encoding or decoding. The processes 1000 and 1100 are described in the form of a set of blocks that specify operations that can be performed. However, operations are not necessarily limited to the order shown in FIG. 10 or 11 or described herein, for the operations may be implemented in alternative orders or in fully or partially overlapping manners. Also, more, fewer, and/or different operations may be implemented to perform the processes 1000 and 1100, or an alternative process. Operations represented by the illustrated blocks of the processes 1000 and 1100 may be performed, at least in part, by the modem 124. More specifically, the operations of the process 1000 may be performed, at least in part, by the zero-crossing-avoidance encoder 132. Also, the operations of the process 1100 may be performed, at least in part, by the zero-crossing-avoidance decoder 212.

At 1002 in FIG. 10, a first pair of consecutive symbols associated with quadrature amplitude modulation is accepted. For example, the zero-crossing-avoidance encoder 132 accepts the first pair of consecutive symbols from the serial-to-parallel converter 206, as shown in FIG. 2. The first pair of consecutive symbols can include symbols 218-M and 218-(M+1) shown in FIG. 7.

At 1004, the first symbol is outputted as part of an encoded data sequence. For example, the zero-crossing-avoidance encoder 132 outputs the symbol 218-M as part of the encoded data sequence 702, as shown in FIG. 7. If the symbol 218-M represents a first symbol in a sequence 602 (e.g., symbol 218-1), the symbol state 406 of the symbol 218-M can remain unchanged. If the symbol 218-M represents another symbol in the sequence 602 (e.g., symbol 218-2, 218-3, 218-4, or 218-5), the zero-crossing avoidance encoder 132 may or may not have modified the symbol state 406 of the symbol 218-M to avoid the zero-crossing condition 222. The modem 124 passes the encoded data sequence 702 to the modulation signal generator 208, as shown in FIG. 2. An example encoded data sequence 702 is represented by sequence 606 in FIG. 6-2.

At 1006, a determination is made that the first pair of consecutive symbols is associated with a zero-crossing condition. For example, the zero-crossing-avoidance encoder 132 determines that the first pair of consecutive symbols is associated with the zero-crossing condition 222, as shown in FIG. 7. The zero-crossing condition 222 represents a signal trajectory 502 between two symbol states 406 of the consecutive symbols 218 that passes through the origin 412 of the constellation diagram 400. Example zero-crossing conditions 222 are shown in FIG. 5. Explained another way, the first pair of consecutive symbols is associated with the zero-crossing condition 222 because the symbol states 406 of the first pair of consecutive symbols have opposite phases. In this case, an absolute value of a phase difference between the first pair of consecutive symbols is approximately equal to 180 degrees.

At 1008, the second symbol is modified, based on the determination, to generate a modified symbol that avoids the zero-crossing condition. For example, the zero-crossing-avoidance encoder 132 modifies, based on the determination, the second symbol 218-(M+1) to avoid the zero-crossing condition 222, as shown at 706 in FIG. 7. In general, the zero-crossing-avoidance encoder 132 at least modifies the phase 410 of the second symbol 218-(M+1) such that an absolute phase difference between the first pair of consecutive symbols is substantially different than 180 degrees (e.g., by +0.5 degree or more for some types of quadrature amplitude modulations 130).

In some example implementations, the zero-crossing-avoidance encoder 132 modifies the second symbol 218-(M+1) such that the first symbol 218-M and the second symbol 218-(M+1) have approximately a same phase 410. In this case, the amplitude 408 of the second symbol 218-(M+1) can be unchanged. In another example implementation, the zero-crossing-avoidance encoder 132 can further modify the second symbol 218-(M+1) such that the first symbol 218-M and the second symbol 218-(M+1) have approximately a same amplitude 408. In the example shown in FIG. 6-2, the symbol 224-5 has a same symbol state 406 as the symbol 224-4, which precedes the symbol 224-5.

Although not explicitly shown, the process 1000 can also include generating a correction list that indicates the second symbol has been modified to avoid the zero-crossing condition. For example, the zero-crossing-avoidance encoder 132 generates the correction list 234. The correction list 234 indicates that the second symbol 218-(M+1) has been modified to avoid the zero-crossing condition 222. The correction list 234 can be a binary correction list 910 or a quadrature-amplitude-modulation correction list 912, as described with respect to FIG. 9. The correction list 234 at least informs a receiving entity about which symbols were encoded to avoid the zero-crossing condition.

In some situations, the receiving entity is configured to perform the appropriate decoding operations to recover the previously-encoded symbols based on the correction list. In this case, the correction list 234 does not have to include decoding instructions. In other situations, the receiving entity may be unaware of the decoding operations, and the correction list 234 can include decoding information to enable the receiving entity to correctly recover the previously-encoded symbols.

At 1102 in FIG. 11, a first pair of consecutive symbols associated with quadrature amplitude demodulation is accepted. The first pair of consecutive symbols comprises a first symbol and a second symbol. For example, the zero-crossing-avoidance decoder 212 accepts the first pair of consecutive symbols 232, as shown in FIG. 2. The first pair of consecutive symbols 232 are associated with quadrature amplitude demodulation. The symbols 232 represents an encoded data sequence without zero-crossing conditions 226.

At 1104, a correction list that identifies the second symbol within the first pair of consecutive symbols as having been modified using zero-crossing-avoidance encoding is accepted. For example, the zero-crossing-avoidance decoder 212 accepts the correction list 234, which identifies the second symbol within the first pair of consecutive symbols as having been modified using zero-crossing-avoidance encoding. The correction list 234 can be a binary correction list 910 or a quadrature-amplitude-modulation correction list 912, as shown in FIG. 9.

At 1106, the second symbol is modified based on the correction list to reverse the zero-crossing-avoidance encoding and generate a modified symbol associated with a zero-crossing condition. For example, the zero-crossing-avoidance decoder 212 modifies the second symbol based on the correction list 234 to reverse the zero-crossing-avoidance encoding (e.g., recover the symbol 218) and generate a modified symbol 236 associated with the zero-crossing condition 222.

At 1108, the first symbol and the modified symbol are outputted as part of a decoded data sequence. For example, the zero-crossing-avoidance decoder 212 outputs the first symbol and the modified symbol as part of a decoded data sequence, as represented by symbols 236 in FIG. 2.

In general, the techniques for zero-crossing-avoidance encoding can be implemented using any type of wireless transceiver 120. Example wireless transceivers 120 can include those that may be unable to meet performance metrics under zero-crossing conditions 222, such as the polar transceiver 126. Other example wireless transceivers 120 include wireless transceivers 120 that can meet performance metrics under zero-crossing conditions 222, such as the Cartesian transceiver 128.

Some aspects are described below.

Aspect 1: An apparatus comprising:
   a polar transceiver configured to:
      be coupled to an antenna; and
      transmit, via the antenna, data comprising multiple symbols associated with quadrature amplitude modulation, the multiple symbols comprising multiple sets of two consecutive symbols, an absolute value of a phase difference between the two consecutive symbols within each set of the multiple sets is substantially different than 180 degrees.

Aspect 2: The apparatus of aspect 1, wherein:
the multiple symbols comprise a first symbol, a second symbol, and a third symbol;
the first symbol, the second symbol, and the third symbol represent consecutive symbols;
the first symbol precedes the second symbol;
the second symbol precedes the third symbol;
a first set of the multiple sets comprises the first symbol and the second symbol; and
a second set of the multiple sets comprises the second symbol and the third symbol.

Aspect 3: The apparatus of aspect 1 or 2, wherein the absolute value of the phase difference differs from 180 degrees by at least ±0.5 degrees.

Aspect 4: The apparatus of aspect 3, wherein the absolute value of the phase difference differs from 180 degrees by at least ±1 degree.

Aspect 5: The apparatus of any previous aspect, wherein the polar transceiver is configured to transmit a correction list identifying symbols within the multiple symbols that have been encoded to avoid a zero-crossing condition.

Aspect 6: The apparatus of aspect 5, wherein:
the two consecutive symbols comprise a first symbol and a second symbol;
the first symbol precedes the second symbol; and
each symbol of the symbols that have been encoded to avoid the zero-crossing condition represents the second symbol within a set of the multiple sets and has a symbol state that is in a same quadrant of a constellation diagram as the first symbol within the set of the multiple sets.

Aspect 7: The apparatus of aspect 6, wherein phases of the first and second symbols within the set of the multiple sets are approximately equal.

Aspect 8: The apparatus of aspect 6 or 7, wherein amplitudes of the first and second symbols within the set of the multiple sets are approximately equal.

Aspect 9: The apparatus of any one of aspects 5 to 8, wherein:
the correction list comprises multiple bits; and
a quantity of the multiple bits is equal to a quantity of the multiple symbols.

Aspect 10: The apparatus any one of aspects 5 to 9, wherein:
the correction list comprises other symbols associated with the quadrature amplitude modulation; and
a quantity of the other symbols is equal to a quantity of the symbols that have been encoded plus one.

Aspect 11: The apparatus of any one of aspects 5 to 10, wherein the zero-crossing condition represents a signal transition that passes through an origin of a constellation diagram between symbol states associated with two symbols.

Aspect 12: The apparatus of any previous aspect, wherein:
the apparatus comprises a wireless earbud; and
the wireless earbud comprises the polar transceiver.

Aspect 13: The apparatus of aspect 12, wherein:
the wireless earbud is configured to transmit a radio-frequency signal associated with Bluetooth®; and
the radio-frequency signal comprises the data.

Aspect 14: An apparatus comprising:
a wireless transceiver configured to:
  be coupled to an antenna;
  communicate, via the antenna, data comprising multiple symbols associated with quadrature amplitude modulation and encoded using zero-crossing-avoidance encoding; and
  communicate, via the antenna, a correction list identifying symbols of the multiple symbols that have been encoded using the zero-crossing-avoidance encoding.

Aspect 15: The apparatus of aspect 14, wherein:
the multiple symbols comprise multiple sets of two consecutive symbols; and
the two consecutive symbols within each set of the multiple sets do not have opposite phases.

Aspect 16: The apparatus of aspect 15, wherein an absolute value of a phase difference between the two consecutive symbols within each set of the multiple sets is substantially different than 180 degrees.

Aspect 17: The apparatus of any one of aspects 14 to 16, wherein each symbol of the symbols that have been encoded using the zero-crossing-avoidance encoding has approximately a same phase as another symbol within the multiple symbols that precedes the symbol.

Aspect 18: The apparatus of aspect 17, wherein each symbol of the symbols that have been encoded using the zero-crossing-avoidance encoding has approximately a same amplitude as the other symbol within the multiple symbols that precedes the symbol.

Aspect 19: The apparatus of any one of aspects 14 to 18, wherein:
the correction list comprises multiple bits;
a quantity of the multiple bits is equal to a quantity of the multiple symbols;
at least one bit of the multiple bits has a first value indicating that a corresponding symbol of the multiple symbols has been encoded using the zero-crossing-avoidance encoding; and
at least one other bit of the multiple bits has a second value indicating that a corresponding symbol of the multiple symbols has not been encoded using the zero-crossing-avoidance encoding.

Aspect 20: The apparatus of any one of aspects 14 to 18, wherein:
the correction list comprises other symbols associated with the quadrature amplitude modulation; and
a quantity of the other symbols is equal to a quantity of the symbols that have been encoded using the zero-crossing-avoidance encoding plus one.

Aspect 21: The apparatus of any one of aspects 14 to 20, wherein the wireless transceiver is configured to communicate, via the antenna, a protocol data unit comprising the data and the correction list.

Aspect 22: The apparatus of any one of aspects 14 to 21, wherein the wireless transceiver comprises:
a transmitter configured to transmit the data and the correction list; or a receiver configured to receive the data and the correction list.

Aspect 23: The apparatus of any one of aspects 14 to 22, wherein the wireless transceiver comprises:
a polar transceiver configured to perform the quadrature amplitude modulation based on amplitudes and phases associated with the multiple symbols; or
a Cartesian transceiver configured to perform the quadrature amplitude modulation based on in-phase and quadrature values associated with the multiple symbols.

Aspect 24: The apparatus of any one of aspects 14 to 23, further comprising:
a modem configured to:
  encode the data using zero-crossing-avoidance encoding; and
  generate modulation signals based on the encoded data; and
the wireless transceiver is configured to transmit a radio-frequency signal comprising the data, the radio-frequency signal is modulated in accordance with quadrature amplitude modulation based on the modulation signals.

Aspect 25: A method of performing zero-crossing-avoidance encoding, the method comprising:
accepting a first pair of consecutive symbols associated with quadrature amplitude modulation, the first pair of consecutive symbols comprising a first symbol and a second symbol;
outputting the first symbol as part of an encoded data sequence;
determining that the first pair of consecutive symbols is associated with a zero-crossing condition; and
modifying, based on the determination, the second symbol to generate a modified symbol that avoids the zero-crossing condition.

Aspect 26: The method of aspect 25, wherein the modifying of the second symbol comprises modifying the second symbol such that an absolute value of a phase difference between the first and second symbols is substantially different than 180 degrees.

Aspect 27: The method of aspect 26, wherein the modifying of the second symbol comprises modifying the second symbol to have a same phase as the first symbol.

Aspect 28: The method of any one of aspects 25 to 27, further comprising: generating a correction list that indicates the second symbol has been modified to avoid the zero-crossing condition.

Aspect 29: The method of any one of aspects 25 to 28, further comprising:

accepting a second pair of consecutive symbols associated with the quadrature amplitude modulation, the second pair of consecutive symbols comprising the modified symbol and a third symbol;

outputting the modified symbol as part of the encoded data sequence; and determining that the second pair of consecutive symbols is not associated with the zero-crossing condition.

Aspect 30: A computer readable storage medium comprising instructions that, responsive to execution by a processor, cause the processor to:

accept a first pair of consecutive symbols associated with quadrature amplitude modulation, the first pair of consecutive symbols comprising a first symbol and a second symbol;

output the first symbol as part of an encoded data sequence;

determine that the first pair of consecutive symbols is associated with a zero-crossing condition;

modify, based on the determination, the second symbol to generate a modified symbol that avoids the zero-crossing condition; and generate a correction list that indicates the second symbol has been modified to avoid the zero-crossing condition.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
a polar transceiver configured to:
be coupled to an antenna;
transmit, via the antenna, data comprising multiple symbols associated with quadrature amplitude modulation, the multiple symbols comprising multiple sets of two consecutive symbols; and
transmit, via the antenna, a correction list identifying symbols within the multiple symbols that have been encoded to avoid a zero-crossing condition.

2. The apparatus of claim 1, wherein
the multiple symbols comprise a first symbol, a second symbol, and a third symbol;
the first symbol, the second symbol, and the third symbol represent consecutive symbols;
the first symbol precedes the second symbol;
the second symbol precedes the third symbol;
a first set of the multiple sets comprises the first symbol and the second symbol; and
a second set of the multiple sets comprises the second symbol and the third symbol.

3. The apparatus of claim 1, wherein an absolute value of a phase difference between the two consecutive symbols within each set of the multiple sets is substantially different than 180 degrees.

4. The apparatus of claim 3, wherein the absolute value of the phase difference differs from 180 degrees by at least ±0.5 degrees or the absolute value of the phase difference differs from 180 degrees by at least ±1 degree.

5. The apparatus of claim 1, wherein
the two consecutive symbols comprise a first symbol and a second symbol;
the first symbol precedes the second symbol; and
each symbol of the symbols that have been encoded to avoid the zero-crossing condition represents the second symbol within a set of the multiple sets and has a symbol state that is in a same quadrant of a constellation diagram as the first symbol within the set of the multiple sets.

6. The apparatus of claim 5, wherein phases of the first and second symbols within the set of the multiple sets are approximately equal.

7. The apparatus of claim 5, wherein amplitudes of the first and second symbols within the set of the multiple sets are approximately equal.

8. The apparatus of claim 1, wherein
the correction list comprises multiple bits; and
a quantity of the multiple bits is equal to a quantity of the multiple symbols.

9. The apparatus of claim 1, wherein
the correction list comprises other symbols associated with the quadrature amplitude modulation; and
a quantity of the other symbols is equal to a quantity of the symbols that have been encoded plus one.

10. The apparatus of claim 1, wherein the zero-crossing condition represents a signal transition that passes through an origin of a constellation diagram between symbol states associated with two symbols.

11. The apparatus of claim 1, wherein
the apparatus comprises a wireless earbud; and
the wireless earbud comprises the polar transceiver.

12. The apparatus of claim 11, wherein
the wireless earbud is configured to transmit a radio-frequency signal associated with Bluetooth®; and
the radio-frequency signal comprises the data.

13. An apparatus comprising:
a wireless transceiver configured to:
be coupled to an antenna;
communicate, via the antenna, data comprising multiple symbols associated with quadrature amplitude modulation and encoded using zero-crossing-avoidance encoding; and communicate, via the antenna, a correction list identifying symbols of the multiple symbols that have been encoded using the zero-crossing-avoidance encoding.

14. The apparatus of claim 13, wherein
the multiple symbols comprise multiple sets of two consecutive symbols; and
the two consecutive symbols within each set of the multiple sets do not have opposite phases.

15. The apparatus of claim 14, wherein an absolute value of a phase difference between the two consecutive symbols within each set of the multiple sets is substantially different than 180 degrees.

16. The apparatus of claim 13, wherein each symbol of the symbols that have been encoded using the zero-crossing-avoidance encoding has approximately a same phase as another symbol within the multiple symbols that precedes the symbol.

17. The apparatus of claim 16, wherein each symbol of the symbols that have been encoded using the zero-crossing-avoidance encoding has approximately a same amplitude as the other symbol within the multiple symbols that precedes the symbol.

18. The apparatus of claim 13, wherein
the correction list comprises multiple bits;
a quantity of the multiple bits is equal to a quantity of the multiple symbols;
at least one bit of the multiple bits has a first value indicating that a corresponding symbol of the multiple symbols has been encoded using the zero-crossing-avoidance encoding; and
at least one other bit of the multiple bits has a second value indicating that a corresponding symbol of the multiple symbols has not been encoded using the zero-crossing-avoidance encoding.

19. The apparatus of claim 13, wherein:
the correction list comprises other symbols associated with the quadrature amplitude modulation; and
a quantity of the other symbols is equal to a quantity of the symbols that have been encoded using the zero-crossing-avoidance encoding plus one.

20. The apparatus of claim 13, wherein the wireless transceiver is configured to communicate, via the antenna, a protocol data unit comprising the data and the correction list.

21. The apparatus of claim 13, wherein the wireless transceiver comprises:
a transmitter configured to transmit the data and the correction list; or
a receiver configured to receive the data and the correction list.

22. The apparatus of claim 13, wherein the wireless transceiver comprises:
a polar transceiver configured to perform the quadrature amplitude modulation based on amplitudes and phases associated with the multiple symbols; or
a Cartesian transceiver configured to perform the quadrature amplitude modulation based on in-phase and quadrature values associated with the multiple symbols.

23. The apparatus of claim 13, further comprising:
a modem configured to:
encode the data using zero-crossing-avoidance encoding; and
generate modulation signals based on the encoded data; and
the wireless transceiver is configured to transmit a radio-frequency signal comprising the data, the radio-frequency signal is modulated in accordance with quadrature amplitude modulation based on the modulation signals.

24. A method of performing zero-crossing-avoidance encoding, the method comprising:
accepting a first pair of consecutive symbols associated with quadrature amplitude modulation, the first pair of consecutive symbols comprising a first symbol and a second symbol;
outputting the first symbol as part of an encoded data sequence;
determining that the first pair of consecutive symbols is associated with a zero-crossing condition;
modifying, based on the determination, the second symbol to generate a modified symbol that avoids the zero-crossing condition; and
generating a correction list that indicates the second symbol has been modified to avoid the zero-crossing condition.

25. The method of claim 24, wherein the modifying of the second symbol comprises modifying the second symbol such that an absolute value of a phase difference between the first and second symbols is substantially different than 180 degrees.

26. The method of claim 25, wherein the modifying of the second symbol comprises modifying the second symbol to have a same phase as the first symbol.

27. The method of claim 24, further comprising:
accepting a second pair of consecutive symbols associated with the quadrature amplitude modulation, the second pair of consecutive symbols comprising the modified symbol and a third symbol;
outputting the modified symbol as part of the encoded data sequence; and
determining that the second pair of consecutive symbols is not associated with the zero-crossing condition.

28. A computer readable storage medium comprising instructions that, responsive to execution by a processor, cause the processor to:
accept a first pair of consecutive symbols associated with quadrature amplitude modulation, the first pair of consecutive symbols comprising a first symbol and a second symbol;
output the first symbol as part of an encoded data sequence;
determine that the first pair of consecutive symbols is associated with a zero-crossing condition;
modify, based on the determination, the second symbol to generate a modified symbol that avoids the zero-crossing condition; and
generate a correction list that indicates the second symbol has been modified to avoid the zero-crossing condition.

* * * * *